(12) United States Patent
Redon

(10) Patent No.: US 10,941,733 B2
(45) Date of Patent: Mar. 9, 2021

(54) AIR HANDLING SYSTEM CONSTRUCTIONS WITH EXTERNALLY-ASSISTED BOOSTING FOR TURBOCHARGED OPPOSED-PISTON ENGINES

(71) Applicant: ACHATES POWER, INC., San Diego, CA (US)

(72) Inventor: Fabien G. Redon, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 16/408,330

(22) Filed: May 9, 2019

(65) Prior Publication Data

US 2019/0264639 A1   Aug. 29, 2019

Related U.S. Application Data

(63) Continuation of application No. 15/562,374, filed as application No. PCT/US2016/023602 on Mar. 22, 2016, now abandoned.

(Continued)

(51) Int. Cl.

| F02M 26/08 | (2016.01) |
|---|---|
| F02B 37/04 | (2006.01) |
| F01B 7/14 | (2006.01) |
| F02B 75/28 | (2006.01) |
| F02B 25/08 | (2006.01) |

(Continued)

(52) U.S. Cl.
CPC ............... *F02M 26/08* (2016.02); *F01B 7/14* (2013.01); *F02B 25/08* (2013.01); *F02B 37/04* (2013.01); *F02B 39/10* (2013.01); *F02B 75/282* (2013.01); *F02M 26/23* (2016.02); *F02M 26/43* (2016.02); *F02B 2075/025* (2013.01); *Y02T 10/12* (2013.01)

(58) Field of Classification Search
CPC ............ F02B 29/0412; F02B 37/04–11; F02B 25/08; F02B 75/28; F02B 75/282; F01B 7/14; F02M 26/06; F02M 26/08; F02M 26/43
See application file for complete search history.

(56) References Cited

U.S. PATENT DOCUMENTS

| 1,857,656 A * | 5/1932 | Oldfield | F02B 75/26 |
|---|---|---|---|
| | | | 123/51 B |
| 2,146,351 A * | 2/1939 | Rochefort | F01B 7/14 |
| | | | 123/51 BA |

(Continued)

FOREIGN PATENT DOCUMENTS

| EP | 1347158 A1 | 9/2003 |
|---|---|---|
| JP | 2005-220891 | 8/2005 |

(Continued)

OTHER PUBLICATIONS

International Search Report and Written Opinion for PCT application No. PCT/US2016/023602, dated Jul. 4, 2016.

(Continued)

*Primary Examiner* — Laert Dounis
(74) *Attorney, Agent, or Firm* — Terrance A. Meador

(57) ABSTRACT

The air handling system of an opposed-piston engine is equipped with an externally-assisted pumping element such as an electrically-assisted compressor, an electrically-assisted supercharger, or an electrically-assisted turbocharger.

12 Claims, 20 Drawing Sheets

Related U.S. Application Data

(60) Provisional application No. 62/143,917, filed on Apr. 7, 2015, provisional application No. 62/171,918, filed on Jun. 5, 2015.

(51) Int. Cl.
  *F02M 26/43* (2016.01)
  *F02M 26/23* (2016.01)
  *F02B 39/10* (2006.01)
  *F02B 75/02* (2006.01)

(56) References Cited

U.S. PATENT DOCUMENTS

| | | | |
|---|---|---|---|
| 2,295,879 A * | 9/1942 | Tucker | F01B 7/12 123/51 BB |
| 2,646,779 A * | 7/1953 | Fiser | F01B 7/14 123/51 BA |
| 5,611,204 A | 3/1997 | Radovanovic et al. | 60/605.2 |
| 5,857,336 A * | 1/1999 | Paul | F01N 5/04 60/597 |
| 6,062,026 A | 5/2000 | Woollenweber et al. | 60/605.2 |
| 6,651,432 B1 * | 11/2003 | Gray, Jr. | F02B 37/14 60/605.2 |
| 6,739,845 B2 | 5/2004 | Woollenweber | 417/407 |
| 7,530,229 B2 | 5/2009 | Akita | 60/608 |
| 8,029,252 B2 | 10/2011 | Noelle | 417/407 |
| 9,581,024 B2 | 2/2017 | Fuqua et al. | F01B 7/14 |
| 2011/0303199 A1 * | 12/2011 | Vuk | F02M 26/43 123/568.11 |
| 2012/0297767 A1 * | 11/2012 | Hofbauer | F02B 39/10 60/605.2 |
| 2013/0174548 A1 | 7/2013 | Dion | 60/605.2 |
| 2014/0208742 A1 * | 7/2014 | Bandyopadhyay | F02M 26/05 60/605.1 |
| 2014/0331656 A1 | 11/2014 | Nagar | 60/297 |
| 2015/0047617 A1 | 2/2015 | Benjey et al. | F02B 33/40 |
| 2015/0337727 A1 | 11/2015 | Fuqua et al. | 60/597 |
| 2018/0306144 A1 | 10/2018 | Redon et al. | F02M 26/08 |

FOREIGN PATENT DOCUMENTS

| | | |
|---|---|---|
| JP | 2009-222007 | 10/2009 |
| WO | WO-98/54449 A1 | 12/1998 |
| WO | WO-2013/126347 | 8/2013 |
| WO | WO-2016/164168 | 10/2016 |

OTHER PUBLICATIONS

Communication pursuant to Article 94(3) EPC, dated Sep. 7, 2018, for European Patent Application No. 16715189.3.

Notification of Reasons for Refusal dated Jan. 28, 2020, issued by the Japanese Patent Office for Japanese Patent Application No. 2017-552436.

Notification of First Office Action dated Jul. 11, 2019, issued by the National Intellectual Property Administration, PRC, for Chinese Patent Application No. 2016800327398.

Communication pursuant to Article 94(3) EPC, dated Jun. 25, 2019, for European Patent Application No. 16715189.3.

* cited by examiner

AIR HANDLING SYSTEM CONSTRUCTIONS WITH EXTERNALLY-ASSISTED BOOSTING FOR TURBOCHARGED OPPOSED-PISTON ENGINES

RELATED APPLICATIONS/PRIORITY

This application claims priority as a continuation of U.S. patent application Ser. No. 15/562,374, filed in the United States Patent Office Sep. 27, 2017 as a § 371 US national phase of PCT/US2016/023602, filed in the US Receiving Office on Mar. 22, 2016, which claims priority to US Provisional application for Patent Ser. No. 62/143,917, filed in the United States Patent Office on Apr. 7, 2015 and US Provisional application for Patent Ser. No. 62/171,918, filed in the United States Patent Office on Jun. 15, 2015. This application contains subject matter related to the subject matter of commonly-owned U.S. patent application Ser. No. 13/782,802, filed Mar. 1, 2013 for "EGR For A Two-Stroke Cycle Engine Without A Supercharger", which was published as US 2013/0174548 A1 on Jul. 11, 2013. This application also contains subject matter related to the subject matter of commonly-owned U.S. patent application Ser. No. 13/891,622, filed May 10, 2013 for "Air Handling Constructions With Turbo-Compounding For Opposed-Piston Engines", which was published as US 2014/0331656 A1 on Nov. 13, 2014.

FIELD OF THE DISCLOSURE

The field is two-stroke cycle internal combustion engines. Particularly, the field relates to uniflow-scavenged, opposed-piston engines with air handling systems that provide pressurized charge air for combustion and transport the products of combustion. In some aspects, the field relates to uniflow-scavenged, opposed-piston engines with air handling systems that recirculate and mix exhaust gas with the pressurized charge air in order to lower combustion temperatures.

BACKGROUND OF THE DISCLOSURE

A two-stroke cycle engine is an internal combustion engine that completes a power cycle with a single complete rotation of a crankshaft and two strokes of a piston connected to the crankshaft. One example of a two-stroke cycle engine is an opposed-piston engine in which two pistons are disposed in opposition in the bore of a cylinder for reciprocating movement in opposing directions. The cylinder has longitudinally-spaced inlet and exhaust ports located near respective ends of the cylinder. Each of the opposed pistons controls one of the ports, opening the port as it moves to a bottom center (BC) location, and closing the port as it moves from BC toward a top center (TC) location. One of the ports provides passage of the products of combustion out of the bore, the other serves to admit charge air into the bore; these are respectively termed the "exhaust" and "intake" ports. In a uniflow-scavenged opposed-piston engine, charge air enters a cylinder through its intake port as exhaust gas flows out of its exhaust port. Thus gas flows through the cylinder in a single direction ("uniflow")—from intake port to exhaust port—to both vacate the cylinder of exhaust gas and to resupply it with charge air ("scavenging").

In FIG. 1, a two-stroke cycle internal combustion engine is embodied by an opposed-piston engine 10 having at least one ported cylinder 50. That is to say, the engine may have one ported cylinder, two ported cylinders, three ported cylinders, or four or more ported cylinders. Each cylinder 50 has a bore 52 and exhaust and intake ports 54 and 56 formed or machined in respective ends of a cylinder wall. Each of the exhaust and intake ports 54 and 56 includes one or more circumferential arrays of openings in which adjacent openings are separated by a solid portion of the cylinder wall (a "bridge"). In some descriptions, each opening is referred to as a "port"; however, the construction of a circumferential array of such "ports" is no different than the port constructions shown in FIG. 1. In the example shown, the engine 10 further includes two crankshafts 71 and 72. The exhaust and intake pistons 60 and 62 are slidably disposed in the bore 52 with their end surfaces 61 and 63 opposing one another. The exhaust pistons 60 are coupled to the crankshaft 71, and the intake pistons are coupled to the crankshaft 72.

As the pistons 60 and 62 of a cylinder 50 near TC, a combustion chamber is defined in the bore 52 between the end surfaces 61 and 63 of the pistons. Fuel is injected directly into the combustion chamber through at least one fuel injector nozzle 70 positioned in an opening through the sidewall of a cylinder 50. The fuel is mixed with charge air compressed between the end surfaces, and it ignites in response to the heat and pressure of the compressed charge air. Combustion follows.

With further reference to FIG. 1, the engine 10 includes an air handling system 80 coupled to intake and exhaust ports of the opposed-piston engine that manages the transport of charge air provided to, and exhaust gas produced by, the engine 10. The engine is "turbocharged" in that the air handling system includes a turbocharger 120 to provide the pressure necessary to aspirate the engine 10. The turbocharger includes a compressor 122 and a turbine 121, which are coupled for mutual rotation. The air handling system construction includes a charge air channel coupled to provide charge air to the intake port or ports of the engine and an exhaust channel coupled to transport exhaust gas from the exhaust port or ports of the engine. The charge air channel includes an inlet for fresh air, the compressor, a charge air passage coupled to the compressor through which charge air is transported to intake ports of the engine, and at least one charge air cooler (CAC) that cools the charge air (or a mixture of gasses including charge air) before delivery to the intake ports. Such a charge air cooler can comprise an air-to-liquid and/or an air-to-air device, or another cooling device. The exhaust channel includes the turbine, an exhaust passage that transports exhaust gas from the exhaust ports of the engine, and other components downstream of the turbine. In some instances, the charge air channel may include a supercharger 110.

In greater detail, the air handling system 80 includes a turbocharger 120 with a turbine 121 and a compressor 122. The turbine 121 and compressor 122 rotate on a common shaft 123. The turbocharger 120 extracts energy from exhaust gas that exits the exhaust ports 54 and flows into an exhaust passage 124 directly from the exhaust ports 54, or from an exhaust manifold 125 that collects exhaust gasses output through the exhaust ports 54. In this regard, the turbine 121 is rotated by exhaust gas passing through it. This rotates the compressor 122, causing it to generate charge air by compressing fresh intake air that flows into it from a charge air channel inlet. The charge air generated by the compressor 122 flows through a charge air passage 126 to a charge air cooler 127. Presuming the addition of the supercharger 110, cooled charge air is pumped by the supercharger 110 to the intake ports. Air compressed by the supercharger 110 may be output through a second charge air cooler 129 to an intake manifold 130. The intake ports 56 receive charge air pumped by the supercharger 110, through the intake manifold 130. Preferably, in multi-cylinder opposed-piston engines, the intake manifold 130 is coupled to an intake plenum that communicates with the intake port or ports 56 of the engine 10.

The air handling system shown in FIG. 1 may be constructed to reduce NOx produced by combustion by recirculating exhaust gas through the ported cylinders of the engine. The recirculated exhaust gas is mixed with charge air to lower peak combustion temperatures, which lowers NOx emissions. This process is referred to as exhaust gas recirculation ("EGR"); and the channel through which the gas is recirculated is referred to as "an EGR loop". The EGR construction shown utilizes exhaust gasses transported from the exhaust ports, via an EGR loop external to the cylinder, into the incoming stream of fresh intake air in the charge air subsystem.

The EGR loop construction shown in FIG. 1 is a high pressure configuration (also called "a short loop"). In this regard, a high pressure EGR loop circulates exhaust gas obtained from a source upstream of the intake of a turbine to a mixing point downstream of the outlet of a compressor. In the EGR loop of FIG. 1, the exhaust passage 131 and the EGR valve 138 shunt a portion of the exhaust gas from the exhaust manifold 125 to be mixed with charge air output by the compressor 122 into the charge air passage 126. This loop subjects the recirculated exhaust gas to the cooling effects of the two coolers 127 and 129. If less cooling is required, the exhaust gas portion can be shunted around the cooler 127 to the inlet of the supercharger 110; this alternative subjects the exhaust gas portion to cooling by only the charge air cooler 129. A dedicated EGR cooler that cools only exhaust gas may be incorporated into the exhaust passage 131, in series with the valve 138, or in series with the outlet port of the valve 138 and the inlet of the supercharger 110.

A low pressure EGR loop (also called a "long loop") circulates exhaust gas obtained from a source downstream of the turbine outlet to a mixing point upstream of the compressor intake. Typically, a short loop EGR configuration is favored for fast response, low complexity, and high durability, at the cost of pumping loss, high concentration of exhaust products in the charge air channel, and turbine lag. A long loop configuration is favored for lower pumping loss, higher mass flow through the turbocharger, and higher cooling capacity, at the cost of even slower turbine response and greater complexity.

FIG. 2 shows the air handling system 80 of FIG. 1, with more detail. In this regard, fresh air is provided to the inlet 122$i$ of the compressor 122 from an inlet 149 via an air filter 150. As the compressor 122 is rotated by the turbine 121, compressed air flows from the compressor's outlet 122$o$, through the charge air passage 126, and into the inlet 151 of the supercharger 110. Charge air pumped by the supercharger 110 flows through the supercharger's outlet 152 into the intake manifold 130. Pressurized charge air is delivered from the intake manifold 130 to the intake ports of the cylinders 50, which are supported in a cylinder block 160. The second cooler 129 may be provided in the charge air channel, in series between the outlet of the supercharger 110 and the intake manifold 130.

Exhaust gas from the exhaust ports of the cylinders 50 flows from the exhaust manifold 125 into the inlet 121$i$ of the turbine 121, and from the turbine's outlet 121$o$ into the exhaust outlet passage 128. A turbine bypass channel 143 including a wastegate valve 144 runs in parallel with the turbine 121, between its inlet 121$i$ and outlet 121$o$. The valve 144 is operated to control the amount of exhaust gas flowing from the engine into the turbine 121. Fully opening the valve 144 to bypass the turbine 121 allows exhaust energy to be transported into the exhaust outlet passage 128 without operating the turbine 121 and compressor 122. In some instances, the turbine 121 may comprise a variable-geometry turbine (VGT) device, which would afford further control of gas flow (and pressure) in the exhaust channel. In these aspects, the turbine 121 will have an effective opening size that may be varied in response to changing speeds and loads of the engine. In some instances, one or more after-treatment devices 162 are provided in the exhaust channel, downstream of a backpressure valve 170. Exhaust is recirculated through the EGR passage 131, under control of the EGR valve 138. The EGR passage 131 is in fluid communication with the charge air channel via an EGR mixer 163. In some instances, although not necessarily, an EGR cooler ("EGR cooler 164") is provided in the EGR passage 131, in series with the EGR valve 138 and the EGR mixer 163. In other instances, there may be no cooler in the EGR passage 131.

With further reference to FIG. 2, the air handling system is equipped for control of gas flow at separate control points in the charge air and exhaust subsystems. In the charge air subsystem, charge air flow and boost pressure are controlled by operation of a recirculation channel 165 coupling the outlet 152 of the supercharger to the supercharger's inlet 151. The recirculation channel 165 includes a valve (the "recirculation valve") 166 that governs the flow of charge air into, and thus the pressure in, the intake manifold 130. A valve (the "backpressure valve") 170 may be provided in the exhaust outlet channel to govern the flow of exhaust out of, and thus the backpressure in, the exhaust subsystem. In those instances when it is provided, the backpressure valve 170 is positioned in the exhaust channel, between the outlet 121$o$ of the turbine 121 and the after-treatment devices 162.

Without a supercharger in the air handling system, a turbocharged two-stroke cycle engine can perform poorly in response to a demand for a sudden increase in engine speed. In this regard, when the engine starts, or when it operates at low loads and/or low speeds, the flow of exhaust may be insufficient to enable the compressor to achieve the speed necessary to increase the flow of charge air ("boost") to a level that is adequate to achieve the requested engine speed. Further, the turbine operation may lag in response to an increasing exhaust flow. In order to reduce the transient response time imposed by the turbocharger, a mechanically-driven supercharger may be added to the charge air channel, downstream of the compressor outlet, so as to quickly provide the boost needed for the demanded increase. However, the supercharger and its associated coupling mechanism bring additional weight and size to the engine and so constitute significant impediments to downsizing.

Further, in the face of requirements for increased efficiency of engine operation, it becomes ever more important to quickly and precisely control gas flow (exhaust and charge air) through the engine in response to changes in speed and load. The control mechanization of the air handling system illustrated in FIG. 2 is representative of the current state of air handling control for turbocharged, opposed-piston engines. As can be seen air handling control for such engines rests essentially on valve-controlled adjustments to exhaust and charge air flow. Some incremental improvement in air handling control may be achieved by use of VGT devices and multi-speed mechanical drives for superchargers. However, these are measures of limited effectiveness and questionable utility.

SUMMARY

It is desirable to equip the air handling system of a turbocharged opposed-piston engine for quick, yet smooth charge air flow acceleration while starting the engine, and in response to acceleration demands encountered during low speed and light load conditions, without sacrificing the engine's efficiency and/or power density. These and other goals and objectives may be realized by use of an externally-assisted pumping element for the charge air channel of the air handling system. Such an externally-assisted pumping element may include an electrically-assisted compressor, an electrically-assisted supercharger, or an electrically-assisted turbocharger.

Desirably, external assistance of the very elements that create charge air flow in a turbocharged, opposed-piston engine provides the basis for finer control of charge air flow over a broader range of effectiveness than is achievable with currently-available air handling constructions.

DETAILED DESCRIPTION OF THE PREFERRED EMBODIMENTS

Figure 1:
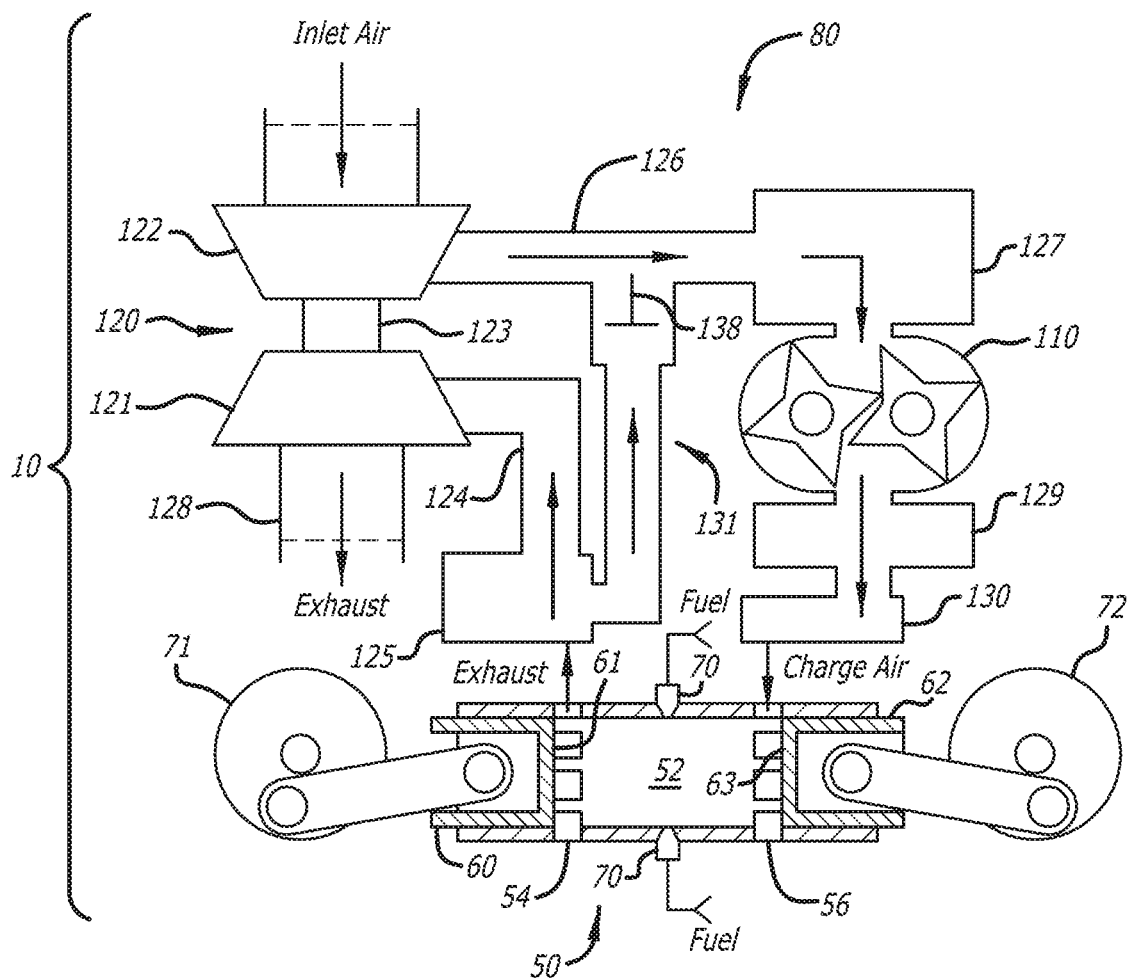
FIG. 1 is a schematic diagram of a prior art turbocharged opposed-piston engine with uniflow scavenging, and is appropriately labeled "Prior Art".
Figure 2:
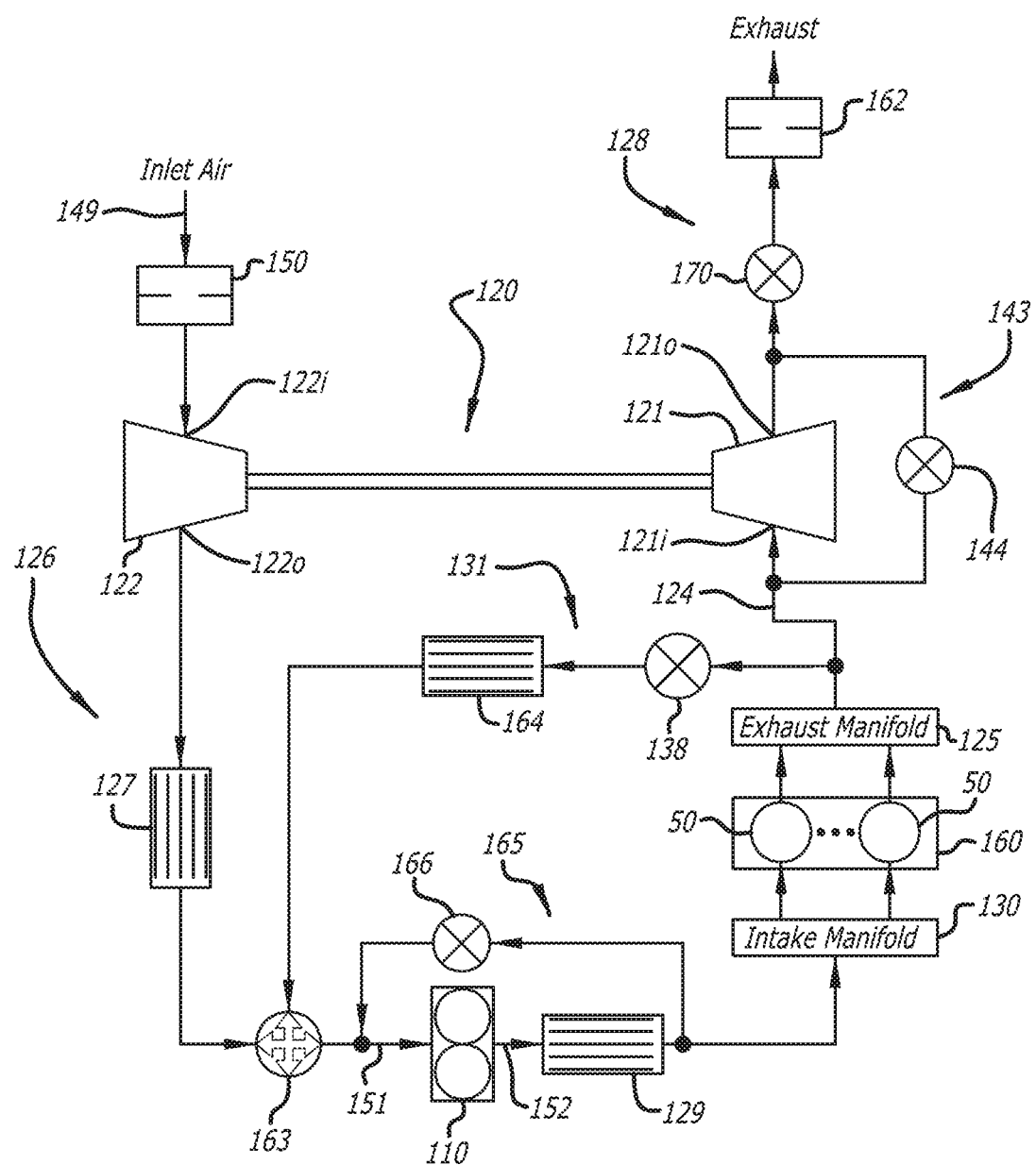
FIG. 2 is a schematic diagram showing details of a prior art air handling system for the opposed-piston engine of FIG. 1, and is appropriately labeled "Prior Art".

This disclosure is directed to aspects of air handling system construction and operation for turbocharged opposed-piston engines with the understanding that these aspects may be combined with other opposed-piston engine systems and functions such as fuel injection, cooling, lubrication, and so on. In this disclosure, an air handling system for a turbocharged opposed-piston engine according to FIG. 2 is modified by provision of one of an electrically-assisted compressor, an electrically-assisted supercharger, and an electrically-assisted turbocharger.

Electrically-Assisted Compressor:

An air handling system for a turbocharged opposed-piston engine in which an electrically-assisted compressor provides boost during engine startup and acceleration is illustrated by respective embodiments shown in FIGS. 3-11. Since boost is provided by the electrically-assisted compressor, these air handling system embodiments do not include a supercharger.

In this disclosure, and with reference to FIGS. 3-11, "an electrically-assisted compressor" means a dynamic compressor device, such as a centrifugal compressor, driven by an associated electric motor. The electrically-assisted compressor is provided as a single compression unit, without an associated turbine. Preferably, but not necessarily, the compressor 200 and its associated electric motor 201 are provided as a single, integrated device. Such devices are available, for example, from Borg-Warner® under the trade name eBOOSTER®. Electrically-assisted compressors may be powered by regenerative electrical storage (batteries, accumulators), or other means, under control of an engine control unit. In the embodiments illustrated in FIGS. 3-8, the electrically-assisted compressor 200 is disposed in the charge air channel, in series with the compressor 122, upstream of the compressor's inlet 122$i$; in FIGS. 9-12, the electrically-assisted compressor 200 is disposed in the charge air channel, in series with the compressor 122, downstream of the compressor's outlet 122$o$.

Figure 3:
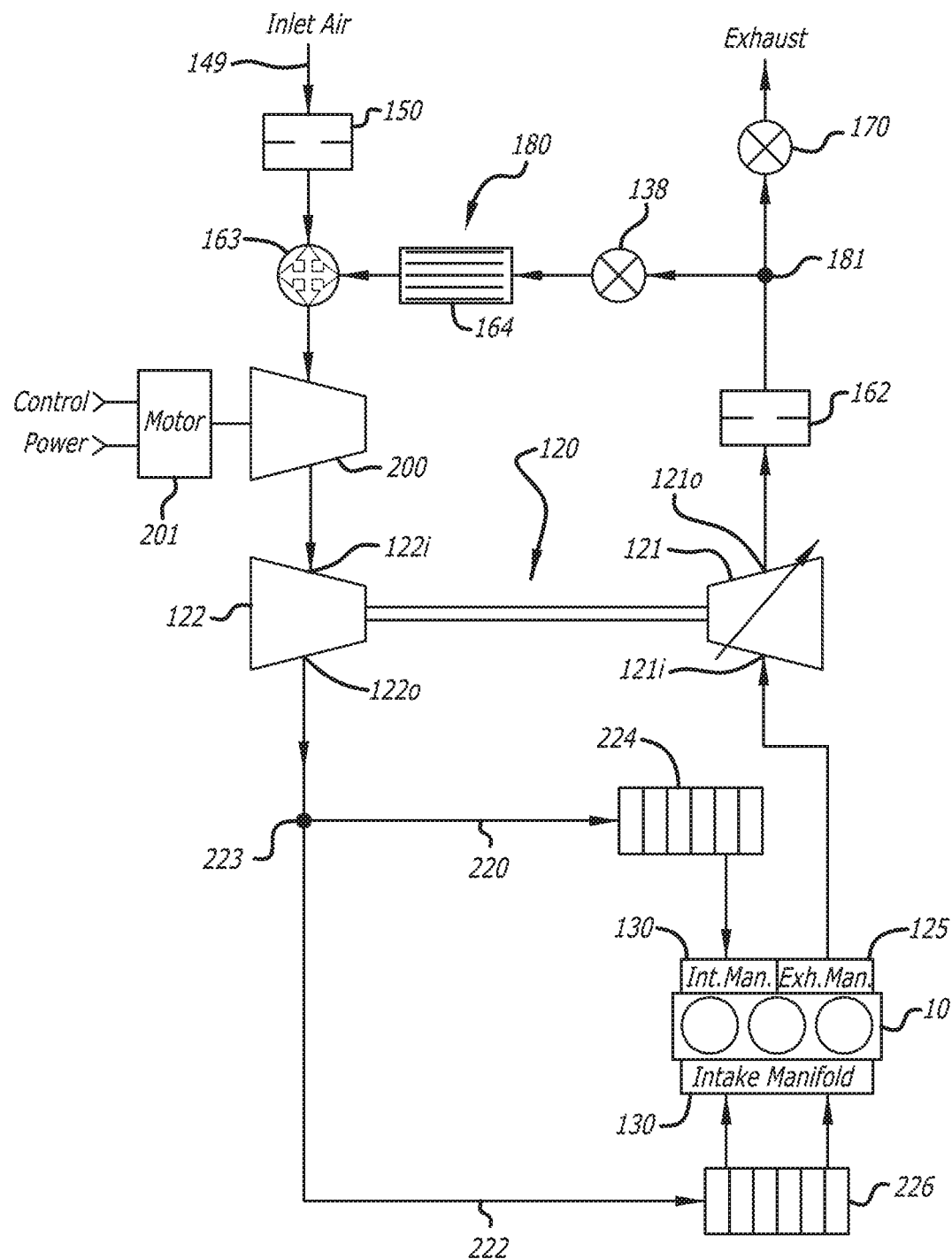
FIGS. 3-8 are schematic diagrams showing respective embodiments of an air handling system for a turbocharged opposed-piston engine in which an electrically-assisted compressor is provided in the charge air channel of the air handling system, upstream of an inlet of the turbocharger compressor.

With reference to FIG. 3, the air handling system includes a long EGR loop 180 having an inlet 181 in the exhaust channel, downstream of the turbine outlet 121$o$ and an outlet, via the EGR mixer 163, in the charge air channel. With the long EGR loop configuration, the exhaust aftertreatment devices 162 are positioned downstream of the backpressure valve in order to take advantage of continued exhaust flow through the EGR loop when the backpressure valve 170 is closed. The electrically-assisted compressor 200 is placed in the charge air channel, in series with the compressor 122, upstream of the compressor inlet 122$i$ and downstream of the EGR mixer 163. In this embodiment, the opposed-piston engine 10 is constructed with a cylinder block having an open intake chamber in which all intake ports are located for receiving charge air, as is taught in commonly-owned U.S. patent application Ser. No. 14/284,058, filed May 21, 2014, for "Air Handling Constructions For Opposed-Piston Engines." The intake chamber has charge air inlets on opposing sides of the engine block. In order to serve the charge air inlets, the charge air channel includes first and second branches 220 and 222 downstream of the compressor 122. The first and second branches 220 and 222 have a common inlet 223 coupled to the outlet 122$o$ of the compressor 122, and each of the branches includes a respective charge air cooler 224 and 226 placed between the common inlet 223 and a respective one of the charge air inlets. Preferably, the turbine 121 comprises a VGT device.

Figure 4:
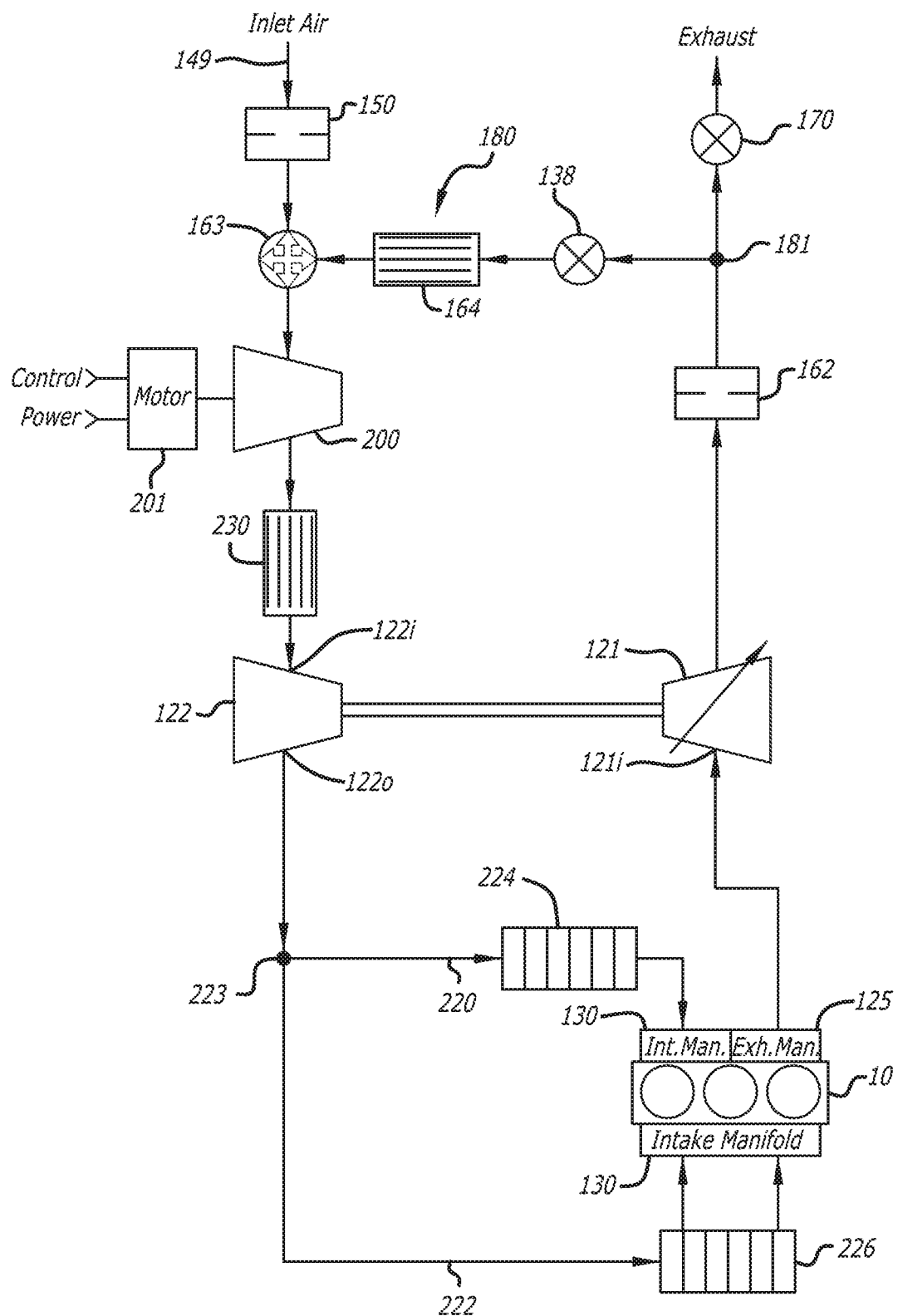

With reference to FIG. 4, the air handling system has the same construction as shown in FIG. 3, with the addition of a third charge air cooler 230 placed in the charge air channel, between the electrically-assisted compressor 200 and the compressor 122.

Figure 5:
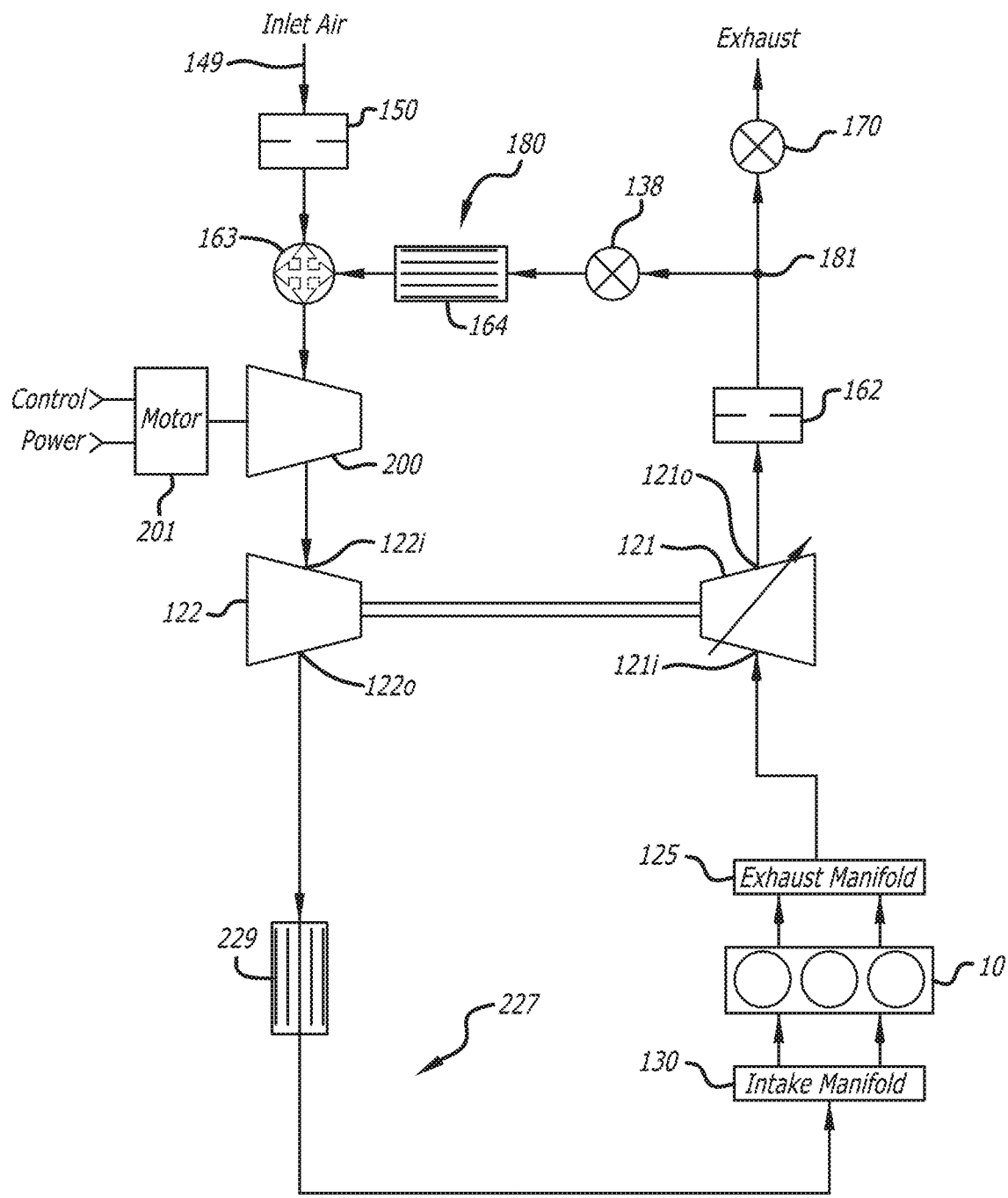
Figure 6:
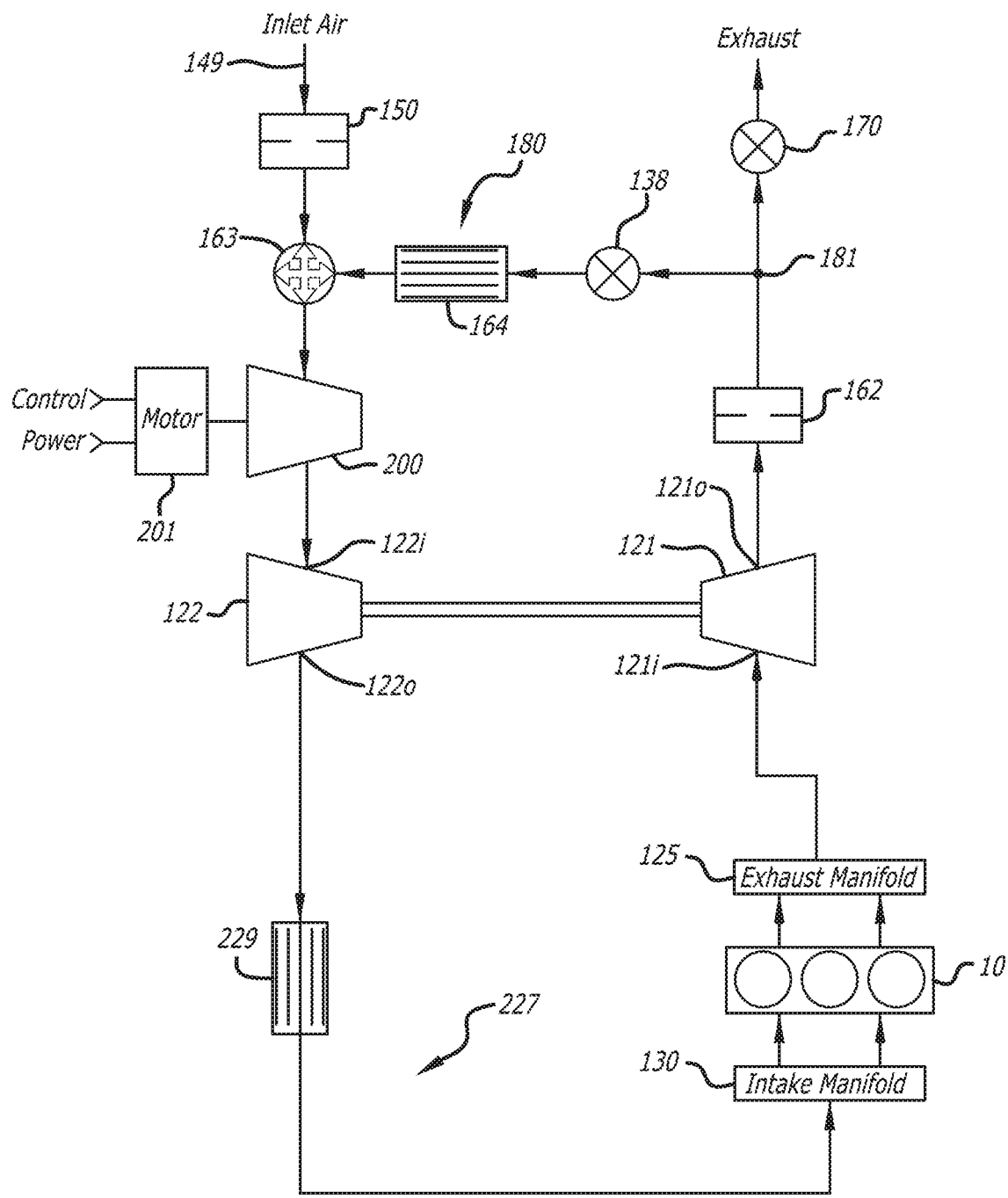

With reference to FIG. 5, the air handling system includes a long EGR loop 180 as per FIG. 3. The electrically-assisted compressor 200 is placed in the charge air channel, in series with the compressor 122, upstream of the compressor inlet 122i and downstream of the EGR mixer 163. In this embodiment, the opposed-piston engine 10 is constructed with a cylinder block having exhaust and intake chambers served by respective manifolds 125 and 130. Accordingly, the charge air channel includes a single charge air passage 227 coupling the compressor outlet 122o with the intake manifold 130. The charge air passage 227 includes a charge air cooler 229 placed in the charge air channel between the outlet 1220 of the compressor 122 and the intake manifold 130. Preferably, the turbine 121 comprises a VGT device. The air handling system illustrated in FIG. 6 has the same construction as shown in FIG. 5, with the exception that the turbine 121 does not comprise a VGT device.

Figure 7:
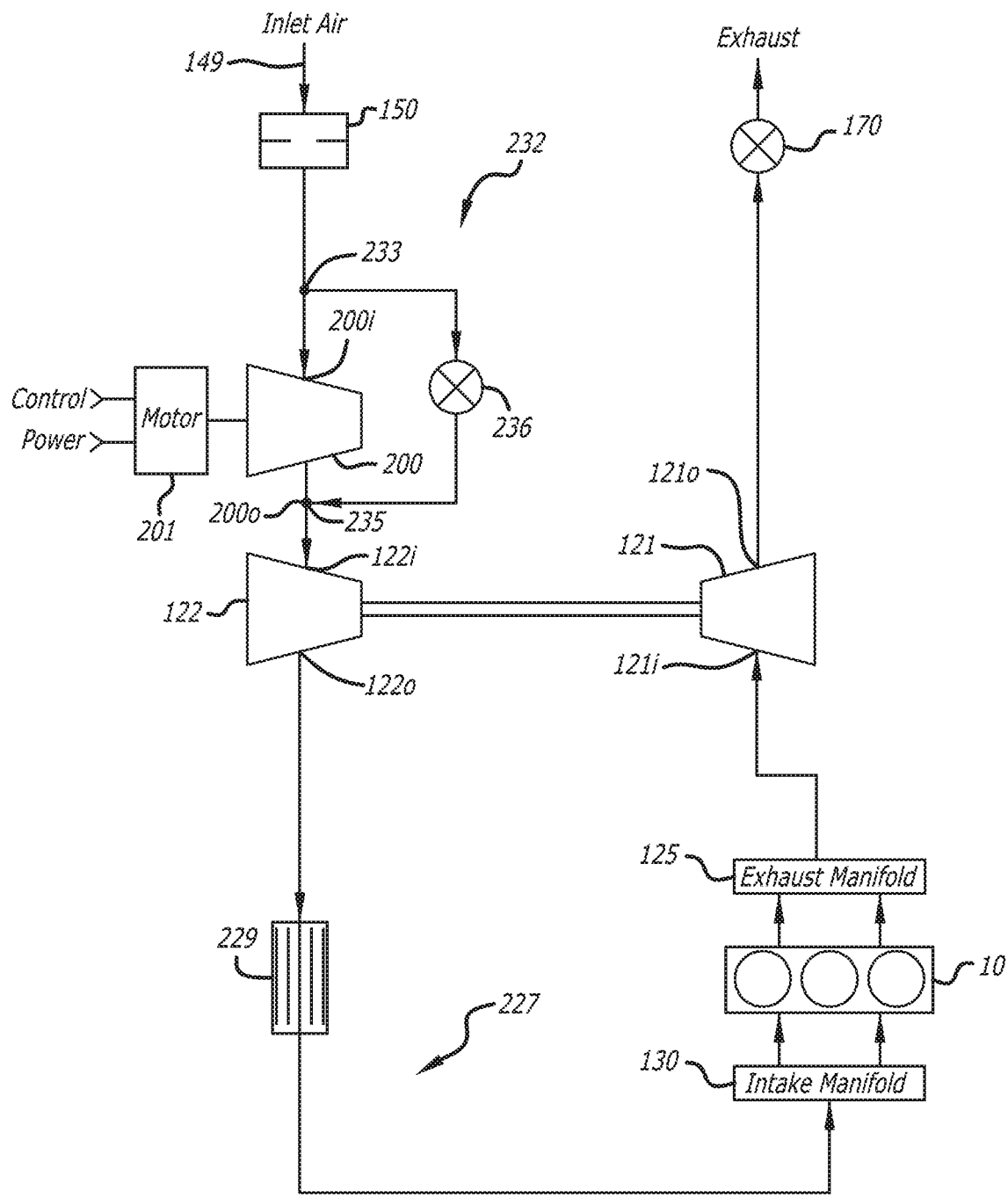
Figure 8:
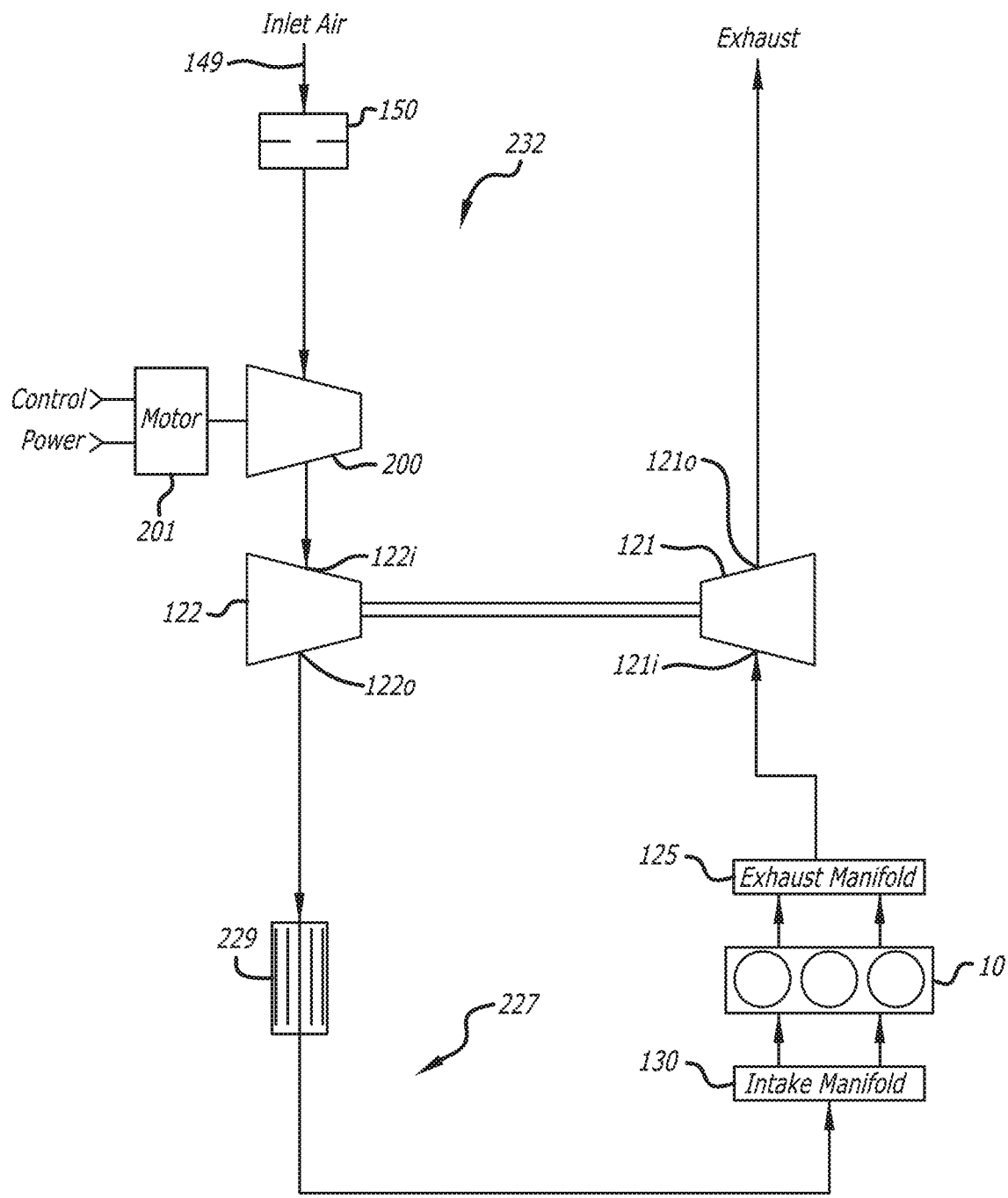

With reference to FIGS. 7 and 8, the air handling systems have the same construction as FIG. 5 except that neither includes an EGR loop or aftertreatment devices; in each case, the turbine 121 may comprise a VGT or a fixed geometry device. Further, the air handling system of FIG. 8 does not include a back pressure valve. The air handling system illustrated in FIG. 7 includes a valve-controlled bypass loop 232 having an inlet 233 in the charge air channel, between the fresh air inlet 149 and an inlet 200i of the electrically-assisted compressor 200, and an outlet 235 in the charge air channel, between the outlet 2000 of the electrically-assisted compressor and the inlet 122i of the compressor 122. The bypass loop 232 includes a bypass valve 236.

Figure 9:
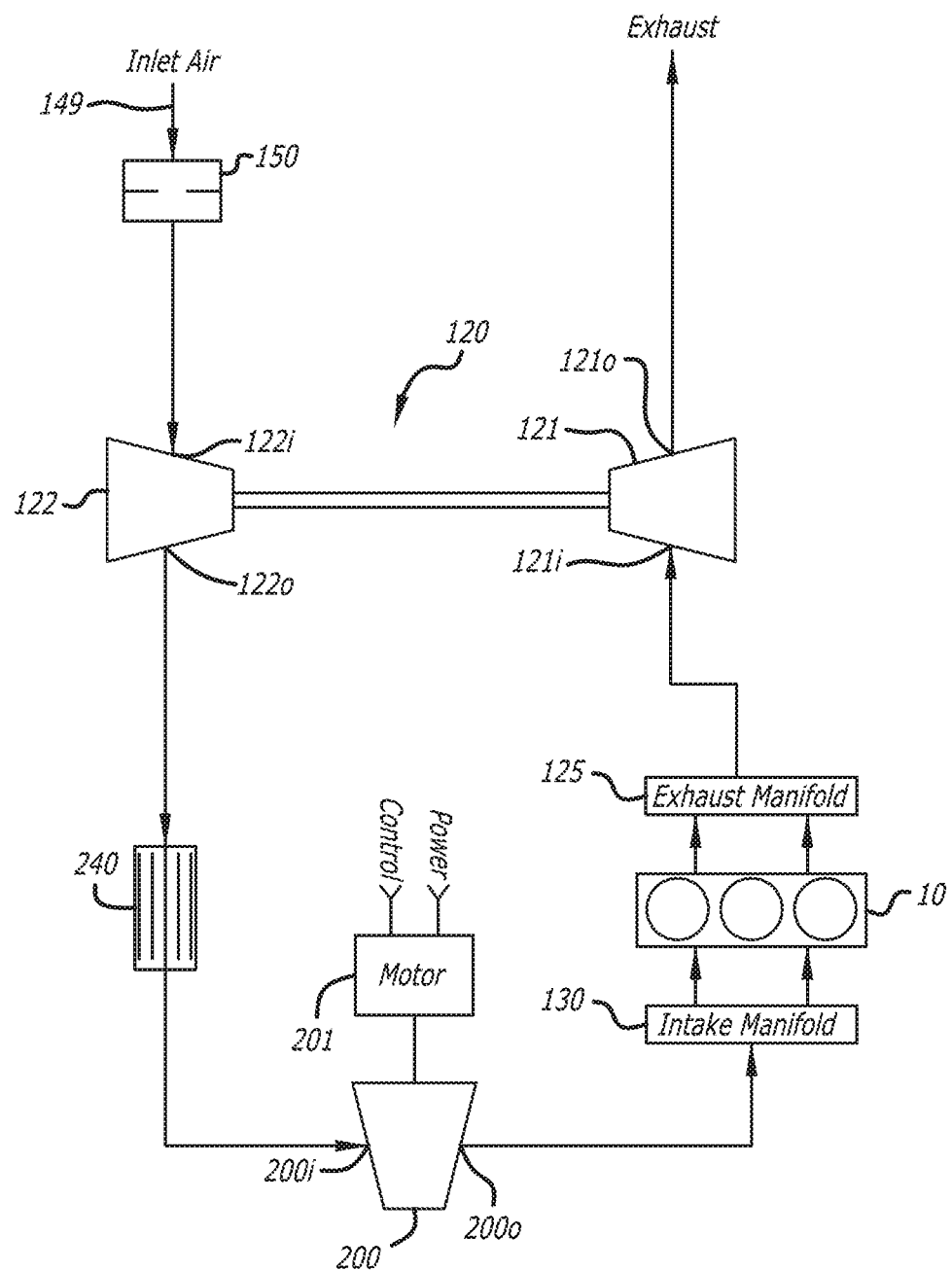
FIGS. 9-11 are schematic diagrams showing respective embodiments of an air handling system for a turbocharged opposed-piston engine in which an electrically-assisted compressor is provided in the charge air channel of the air handling system, downstream of an outlet of the turbocharger compressor.
Figure 10:
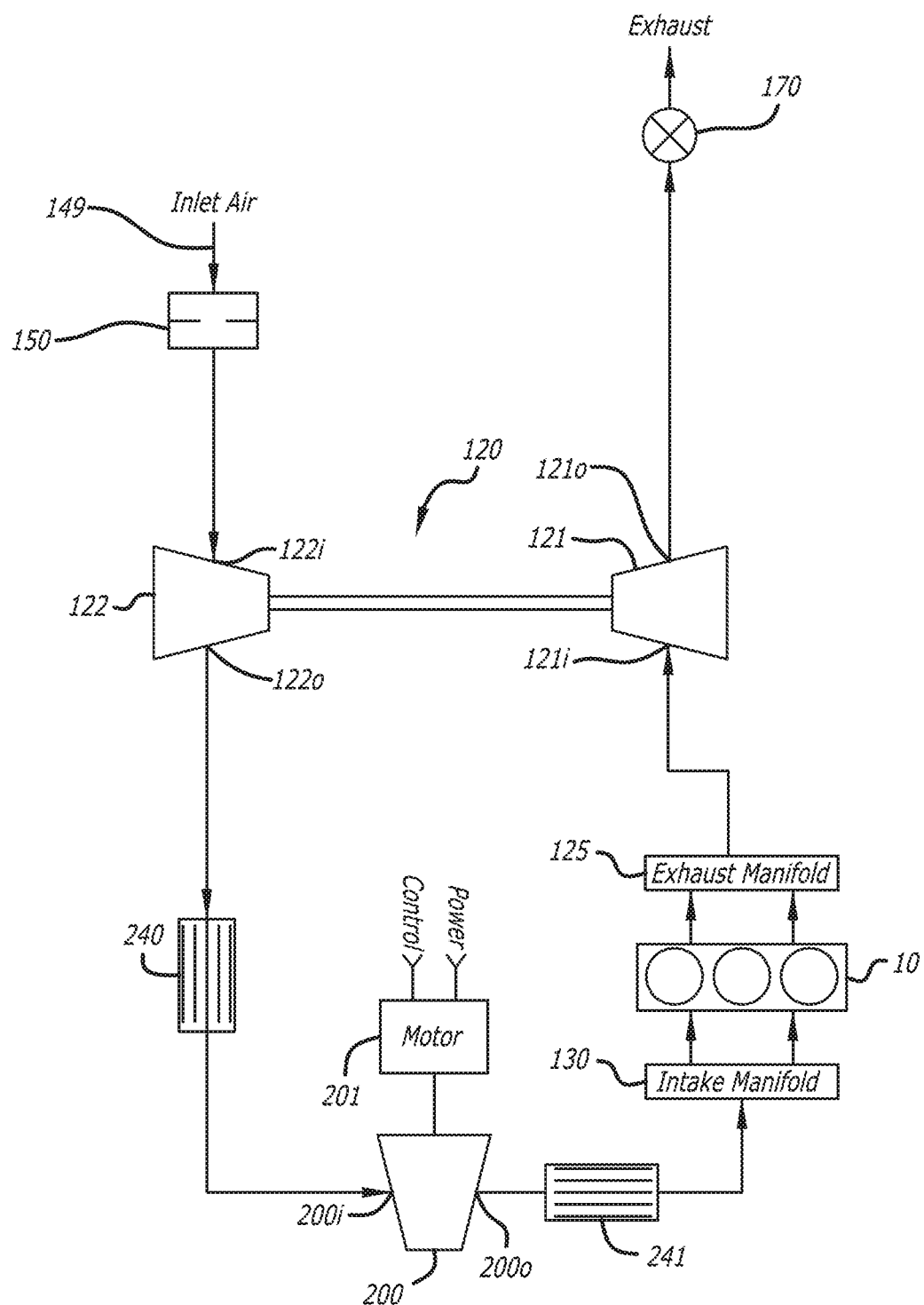
Figure 11:
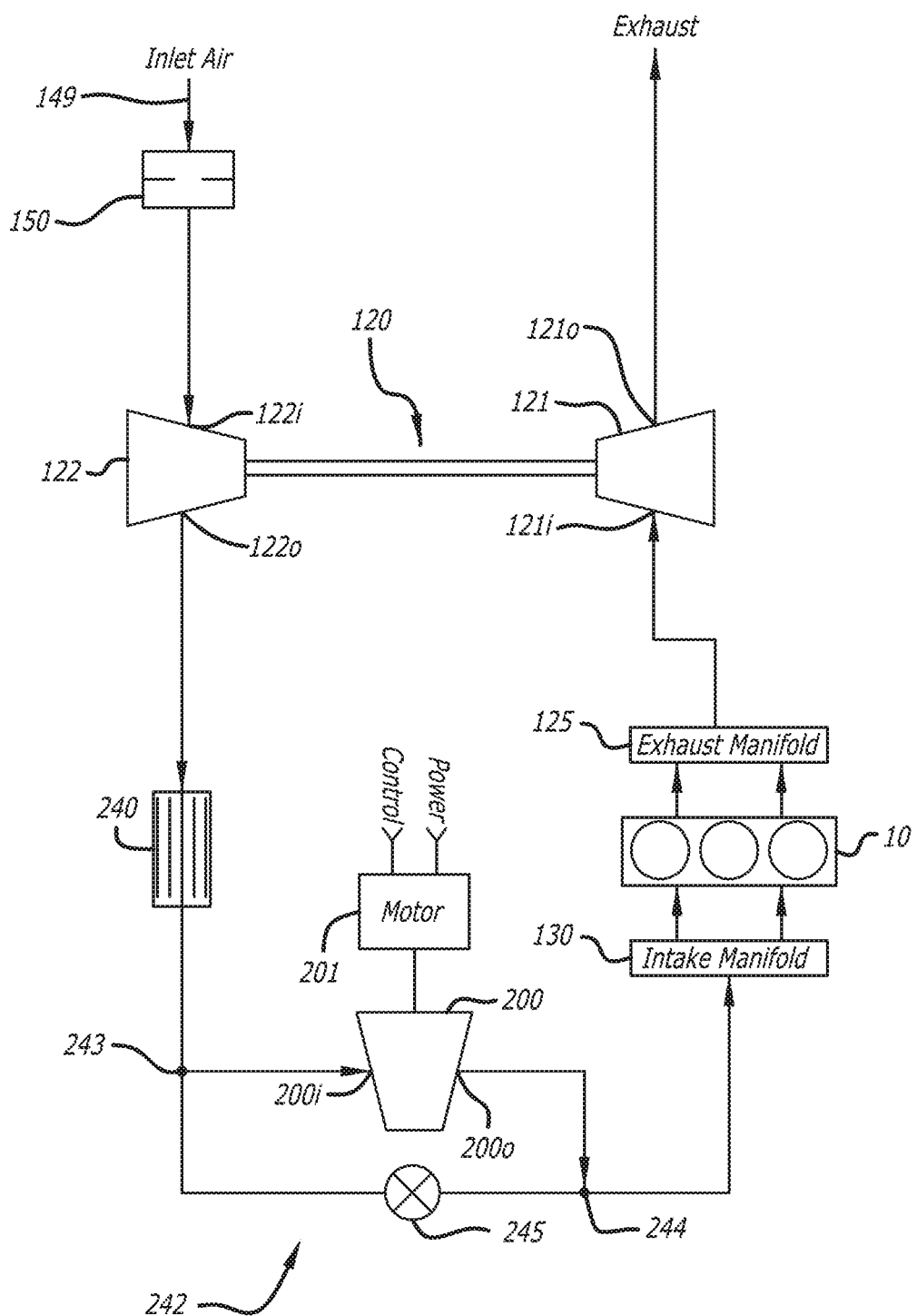

With reference to the air handling system illustrated in FIG. 9, the electrically-assisted compressor 200 is placed in the charge air channel, in series with the compressor 122, downstream of the compressor outlet 122o and upstream of the intake ports of the engine 10, specifically, upstream of the intake manifold 130. A charge air cooler 240 is in the charge air channel, between the outlet 1220 of the compressor 122 and the inlet 200i of the electrically-assisted compressor 200. In FIG. 10, the air handling system of FIG. 9 is modified by addition of a charge air cooler 241 in the charge air channel, between the outlet 200o of the electrically-assisted compressor 200 and the intake manifold 130. In FIG. 11, the air handling system of FIG. 9 is modified by addition of a valve-controlled backflow prevention passage 242 in the charge air channel, downstream of the charge air cooler 240, and having an inlet 243 in the charge air channel in common with the inlet 200i of the electrically-assisted compressor 200 and an outlet 244 in the charge air channel, upstream of the intake manifold 130, in common with the outlet 2000 of the electrically-assisted compressor 200. The backflow prevention passage 242 includes a valve 245. The purpose of the backflow prevention passage is to let the main turbocharger 120 operate without restriction when the electrically-assisted compressor 200 is not needed.

Figure 12:
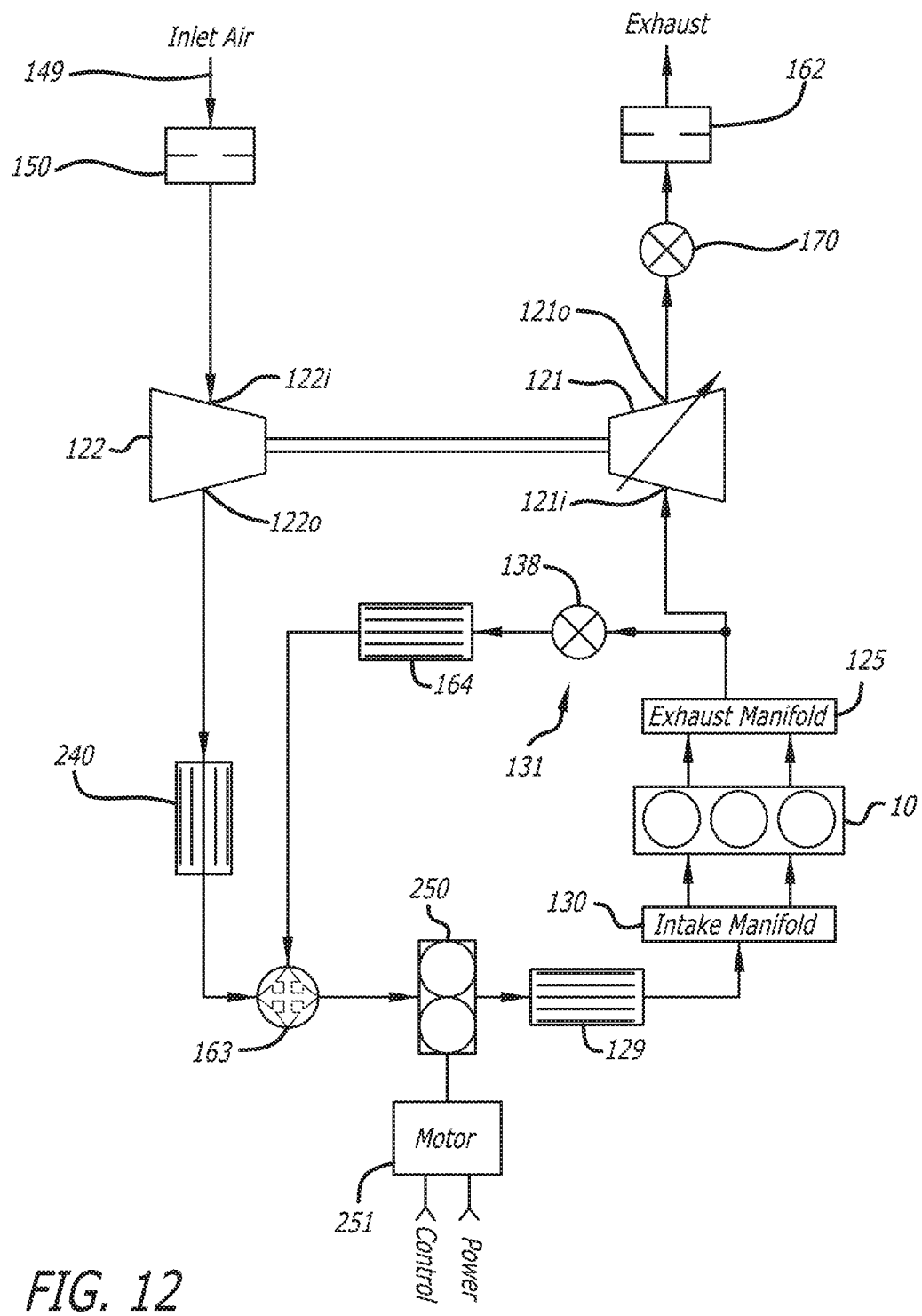
FIGS. 12 and 13 are schematic diagrams showing respective embodiments of an air handling system for a turbocharged opposed-piston engine in which an electrically-assisted supercharger is provided in the charge air channel of the air handling system, downstream of an outlet of the turbocharger compressor.
Figure 13:
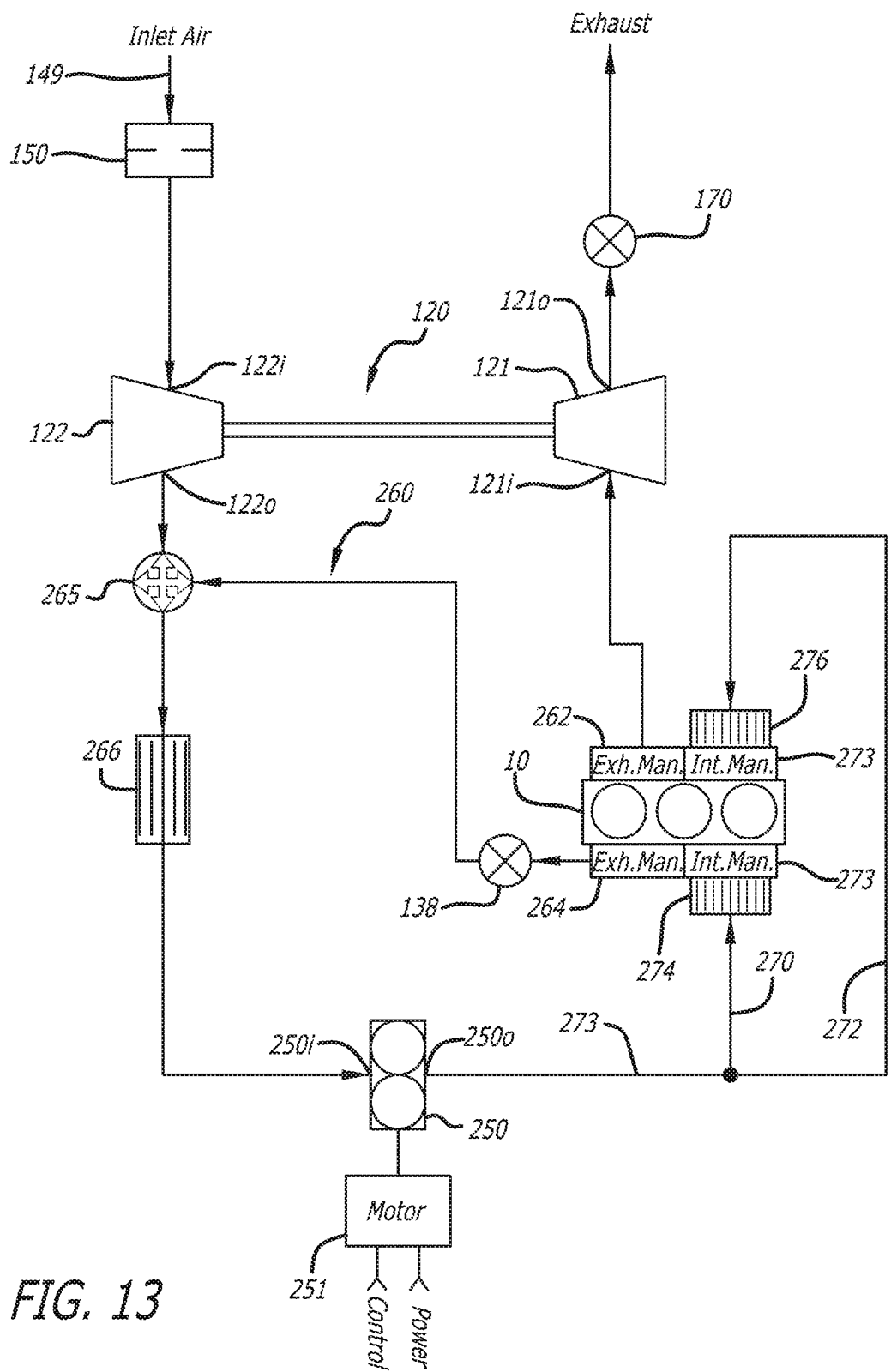
Figure 14:
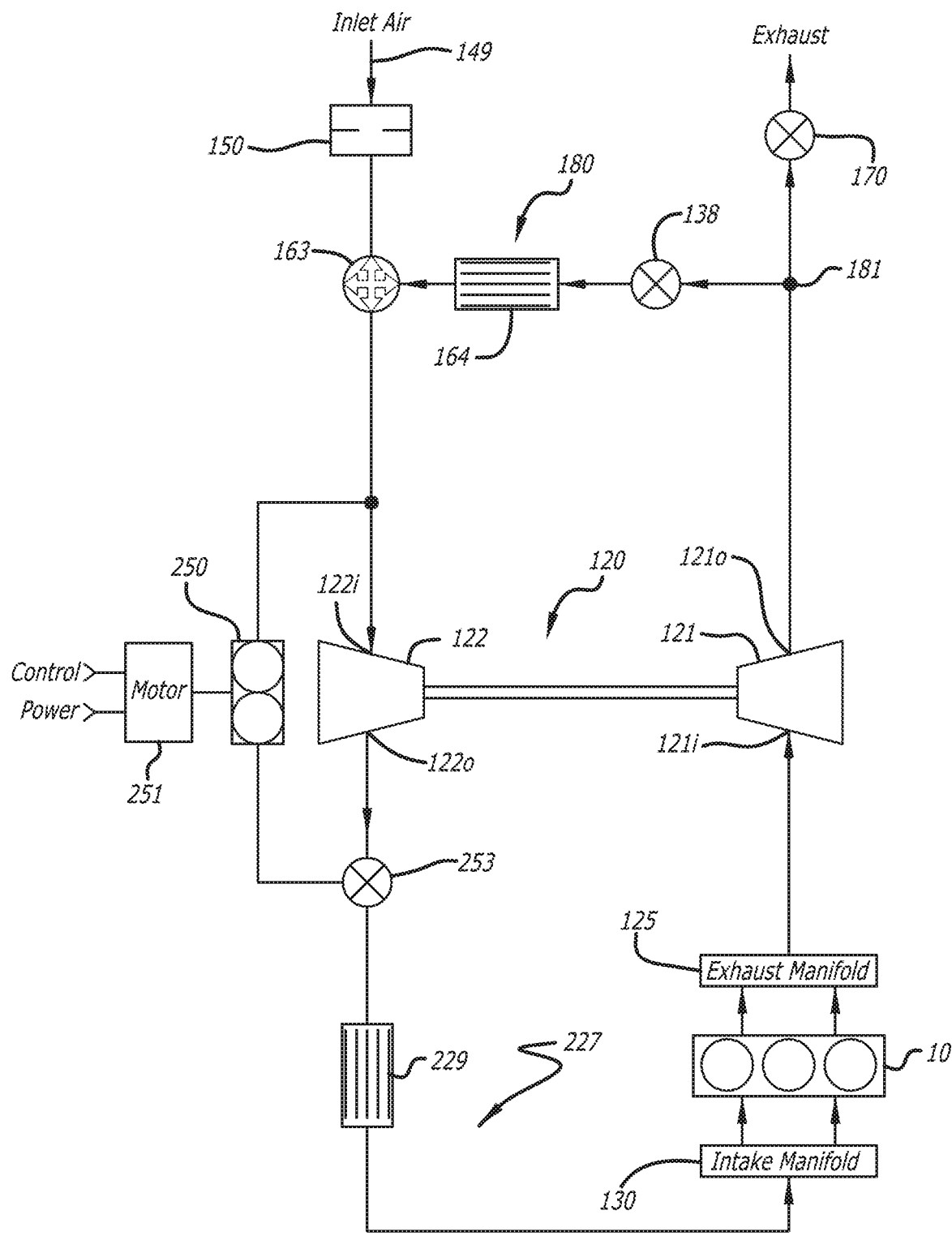
FIG. 14 is a schematic diagram showing an embodiment of an air handling system for a turbocharged opposed-piston engine in which an electrically-assisted supercharger is provided in the charge air channel of the air handling system, in parallel with the turbocharger compressor.

Electrically-Assisted Supercharger:

An air handling system for a turbocharged opposed-piston engine in which an electrically-assisted supercharger provides boost during engine startup and acceleration is illustrated by respective embodiments shown in FIGS. 12-14.

In this disclosure, and with reference to FIGS. 12-14, "an electrically-assisted supercharger" means a positive-displacement air-compression device, such as a Roots-type blower, driven by an associated electric motor. The electrically-assisted supercharger is not a dynamic gas flow compressor, such as a centrifugal compressor, it is provided as a single compression unit, without an associated turbine. Such devices are described, for example, in US 2015/0047617, published Feb. 19, 2015. Preferably, but not necessarily, the supercharger 250 and its associated electric motor 251 are provided as a single, integrated device. Electrically-assisted superchargers may be powered by regenerative electrical storage (batteries, accumulators), or other means, under control of an engine control unit. In the embodiments illustrated in FIGS. 12 and 13, the electrically-assisted supercharger 250 is disposed in the charge air channel, in series with the compressor 122, downstream of the compressor's outlet 122o. In the embodiment illustrated in FIG. 14, the supercharger is disposed in the charge air channel, in parallel with the compressor 122.

With reference to FIG. 12, the air handling system conforms to the construction of the air handling system 80 of FIG. 2, including the short EGR loop 131, with the exception that the supercharger 110 is replaced with the electrically-assisted supercharger 250 and its associated motor 251. Further, given the degree of control over charge air flow afforded by the electrically-assisted supercharger, the air handling system does not include a supercharger recirculation loop.

With reference to the embodiment illustrated in FIG. 13, the opposed-piston engine 10 is constructed with a cylinder block having open exhaust and intake chambers. All exhaust ports of the engine are located in the open exhaust chamber for expelling exhaust gas and all intake ports are located in the open intake chamber for receiving charge air, as is taught in commonly-owned U.S. patent application Ser. No. 14/284,058, filed May 21, 2014, for "Air Handling Constructions For Opposed-Piston Engines." The exhaust chamber has exhaust outlets on opposing sides of the cylinder block and the intake chamber has charge air inlets on the same opposing sides of the engine block.

One of the exhaust outlets is coupled to provide exhaust gas to the turbine inlet 122i via the manifold 262; the other exhaust outlet is coupled to the inlet of a short EGR loop 260 by an exhaust manifold 264. The outlet of the short EGR loop 260 is placed in the charge air channel via the mixer 265, downstream of the compressor 122, between the compressor outlet 122o and the charge air cooler 266. The charge air cooler 266 is placed in the charge air channel, downstream of the mixer 265, between the mixer 265 and the inlet 250i of the electrically-assisted supercharger 250.

In order to serve the charge air inlets, the charge air channel includes first and second branches 270 and 272 downstream of the electrically-assisted supercharger 250. The first and second branches 270 and 272 have a common inlet 273 coupled to the outlet 2500 of the electrically-assisted supercharger 250, and each of the branches includes a respective charge air cooler 274 and 276 placed between the common inlet 273 and a respective one of the charge air inlets. The turbine 121 may comprise a VGT device.

Although not shown in FIGS. 12 and 13, the air handling system may be provided with a recirculation channel as per the recirculation channel 165 seen in FIG. 2.

Referring to FIG. 14, the illustrated air handling system has a much simpler construction than that shown and described in FIG. 13. An electric motor 251 mechanically driving a supercharger 250 to provide an electrically assisted supercharger is located in parallel with the turbo charger compressor 122. Furthermore, single intake and exhaust manifolds 130 and 125 are located respectfully, one either side of the cylinder block. With this configuration, a regular turbocharger can be used avoiding the complexities of mechanically, or electrically, driving the turbine to provide a variable speed turbocharger. Optionally, a long EGR loop 180 may be added before the supercharger 250, on the low-pressure outlet side 1210 of the turbine 121. Higher motor speeds are compatible with a smaller supercharger running at higher-pressure ratios. Furthermore, this configuration may be better with high efficiency turbochargers because the supercharger can supply very low air flow and can be switched off when turbocharger efficiencies are high enough to provide a pressure differential from intake to exhaust. A control valve 253 located between the compressor outlet and the supercharger can balance airflow between the supercharger and compressor outlets for precise balance of required pressure differentials.

Electrically-Assisted Turbocharger:

In an air handling system for a turbocharged opposed-piston engine, the turbocharger comprises an electrically-assisted turbocharger as illustrated by respective embodiments shown in FIGS. 15-19. In these embodiments, boost is provided by electrical assistance to the compressor.

In this disclosure, and with reference to FIGS. 15-19, "an electrically-assisted turbocharger" means a turbocharger 320 comprising a turbine 321 and compressor 322 coupled for mutual rotation on a common shaft to which an associated electric motor 325 is also drivingly coupled. Preferably, but not necessarily, the turbocharger 320 and its associated electric motor 325 are provided as a single, integrated device. Such devices are described, for example, in U.S. Pat. No. 6,739,845, issued May 25, 2004. Electrically-assisted turbochargers may be powered by regenerative electrical storage (batteries, accumulators), or other means, under control of an engine control unit. In the embodiments illustrated in FIGS. 14-19, the electrically-assisted turbocharger 320 is placed with the turbine in the exhaust channel and the compressor in the charge air channel.

Figure 15:
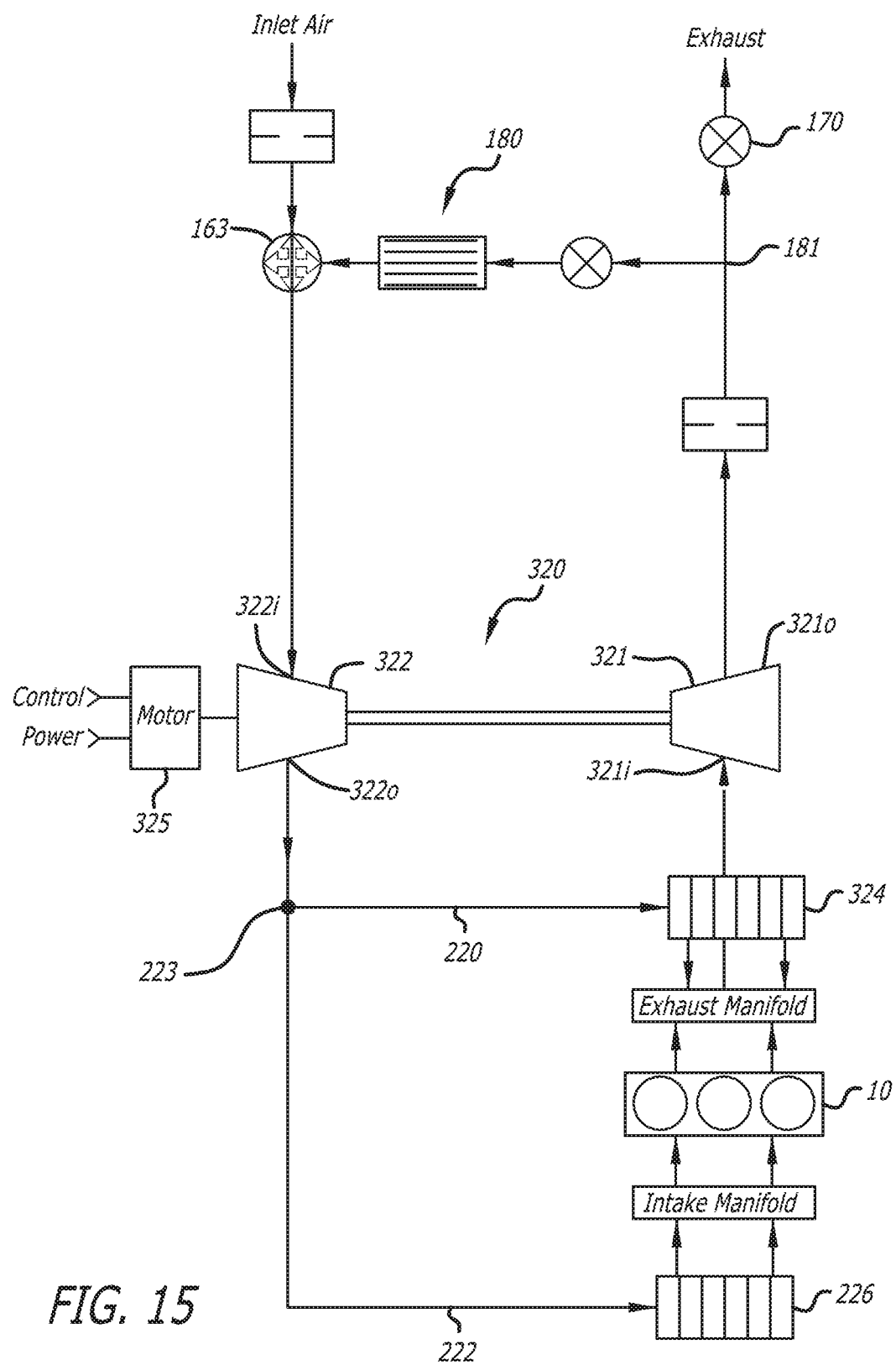
FIGS. 15-20 are schematic diagrams showing respective embodiments of an air handling system for an opposed-piston engine equipped with an electrically-assisted turbocharger.
Figure 16:
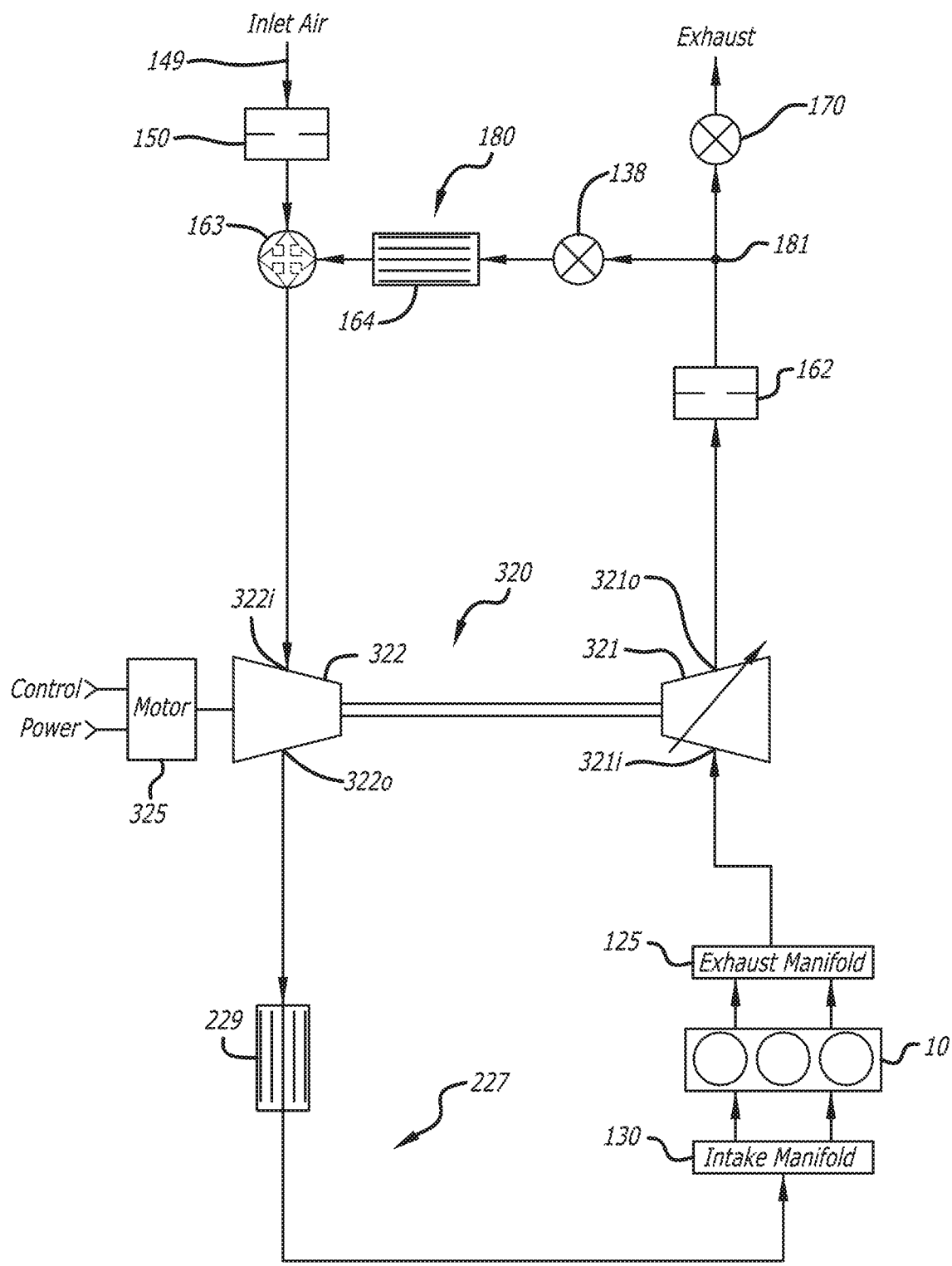
Figure 17:
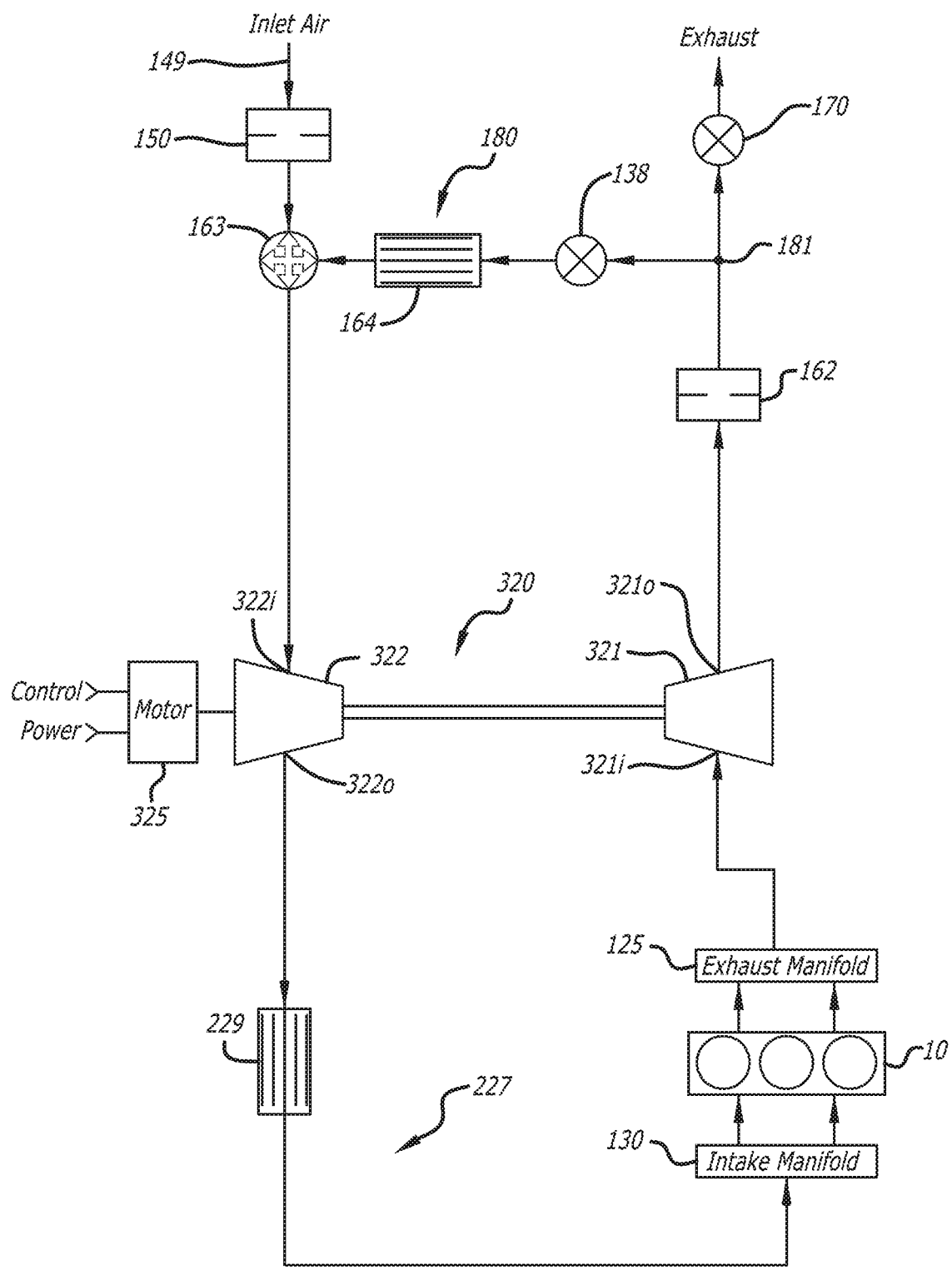

With reference to FIGS. 15-17, the electrically-assisted turbocharger 320 is situated in the air handling system in the same manner as the non-assisted turbocharger 120 of FIG. 3. As per FIGS. 15-17, the air handling system includes a long EGR loop 180 having an inlet 181 in the exhaust channel, downstream of the turbine outlet 321o and an outlet, via the EGR mixer 163, in the charge air channel, upstream of the compressor inlet 322i.

In the embodiment illustrated in FIG. 15, the opposed-piston engine 10 is constructed with a cylinder block having an open intake chamber in which all intake ports are located for receiving charge air, as is taught in commonly-owned U.S. patent application Ser. No. 14/284,058, filed May 21, 2014, for "Air Handling Constructions For Opposed-Piston Engines." The intake chamber has charge air inlets on opposing sides of the engine block. In order to serve the charge air inlets, the charge air channel includes first and second branches 220 and 222 downstream of the compressor 322. The first and second branches 220 and 222 have a common inlet 223 coupled to the outlet 322o of the compressor 322, and each of the branches includes a respective charge air cooler 324 and 326 placed between the common inlet 223 and a respective one of the charge air inlets. The turbine 321 may comprise fixed geometry device or a VGT device.

In FIG. 16, the opposed-piston engine 10 is constructed with a cylinder block having exhaust and intake chambers served by respective manifolds 125 and 130. Accordingly, the charge air channel includes a single charge air passage 227 coupling the compressor outlet 322o with the intake manifold 130. The charge air passage 227 includes a charge air cooler 229 placed in the charge air channel between the outlet 322o of the compressor 322 and the intake manifold 130. Preferably, the turbine 321 comprises a VGT device. The air handling system illustrated in FIG. 17 has the same construction as shown in FIG. 16, with the exception that the turbine 321 does not comprise a VGT device. The air handling system illustrated in FIG. 18 has the same construction as shown in FIG. 17, with the exception that the aftertreatment devices are removed from the exhaust channel.

Figure 18:
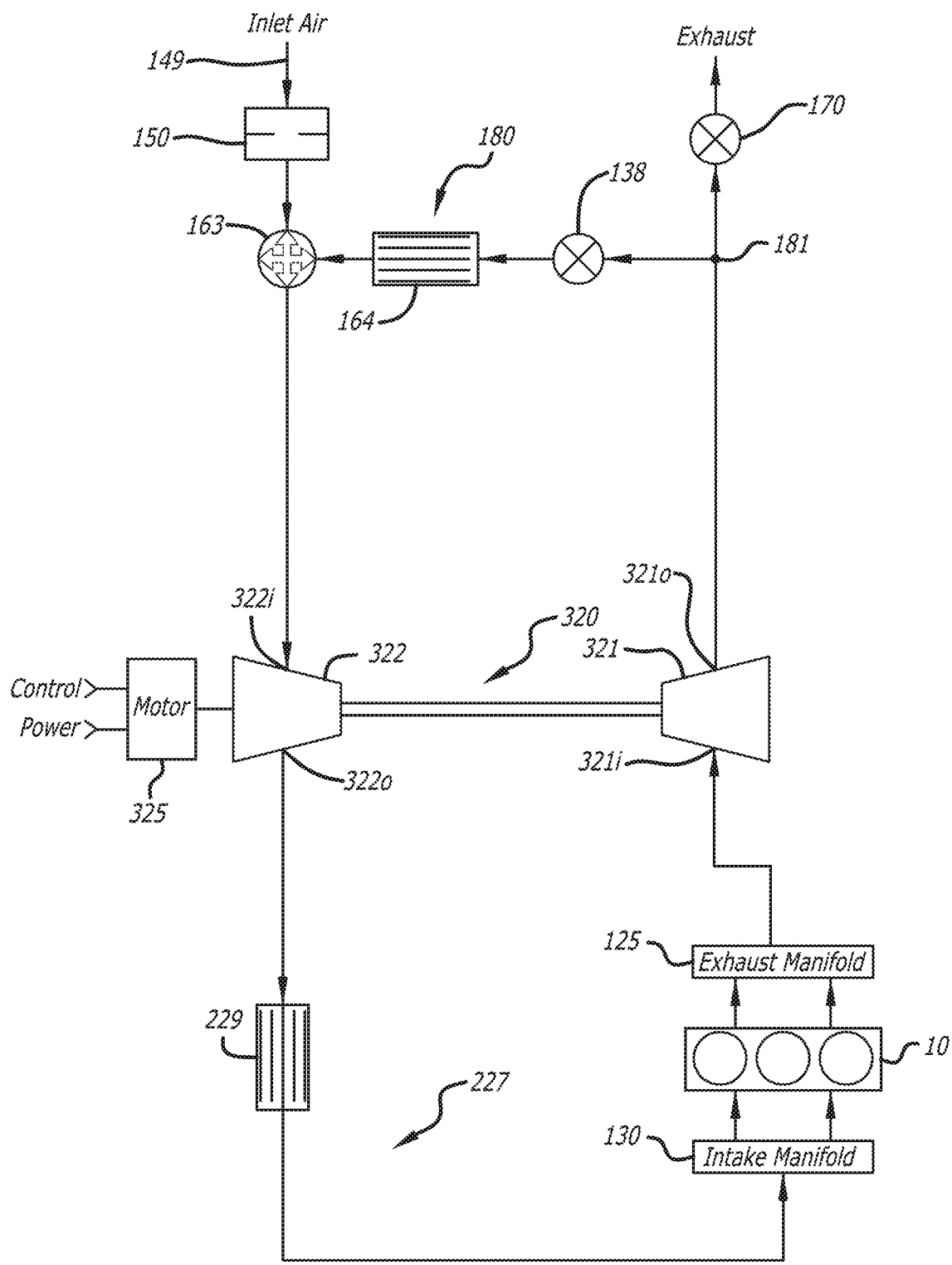
Figure 19:
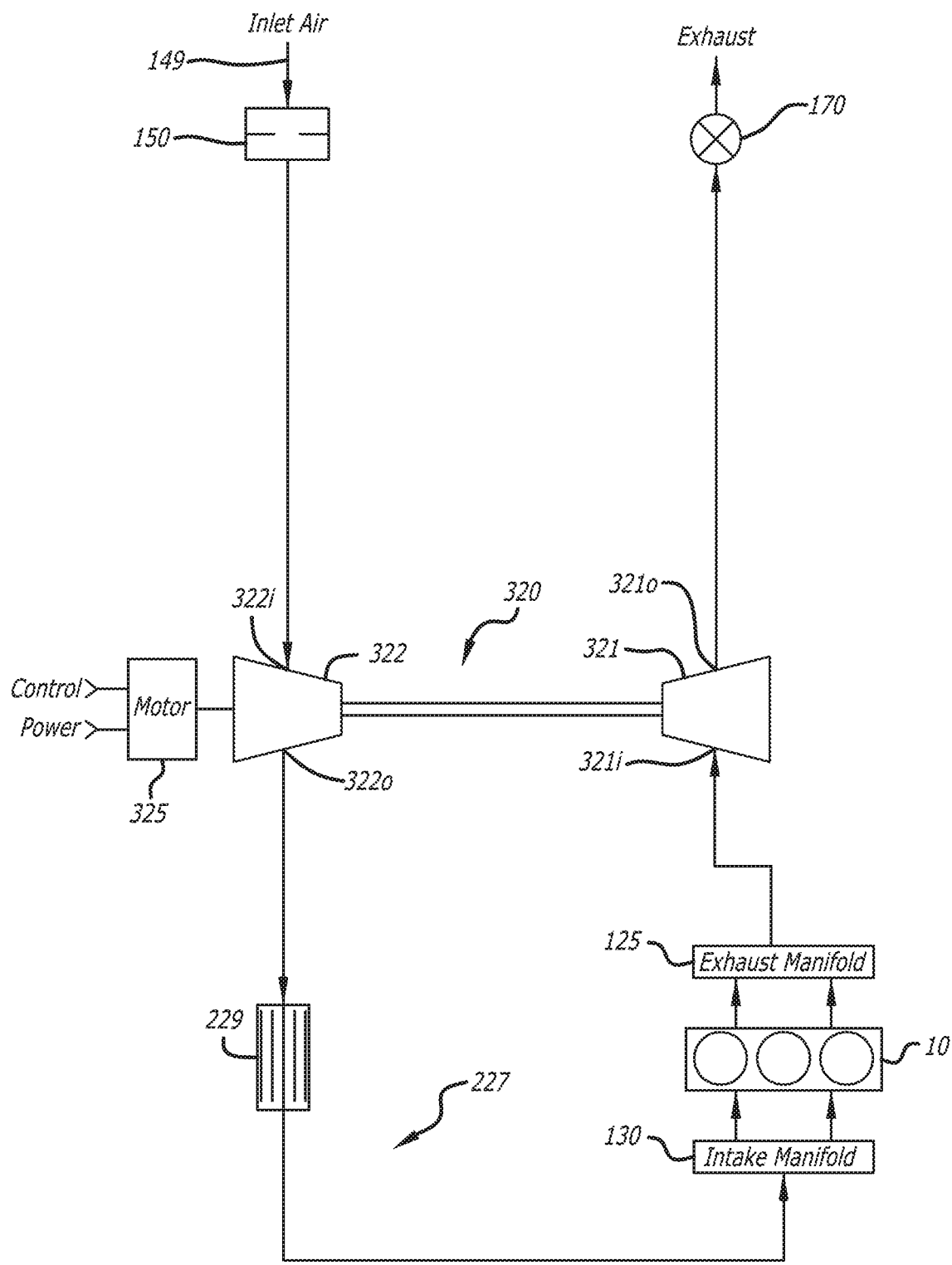
Figure 20:
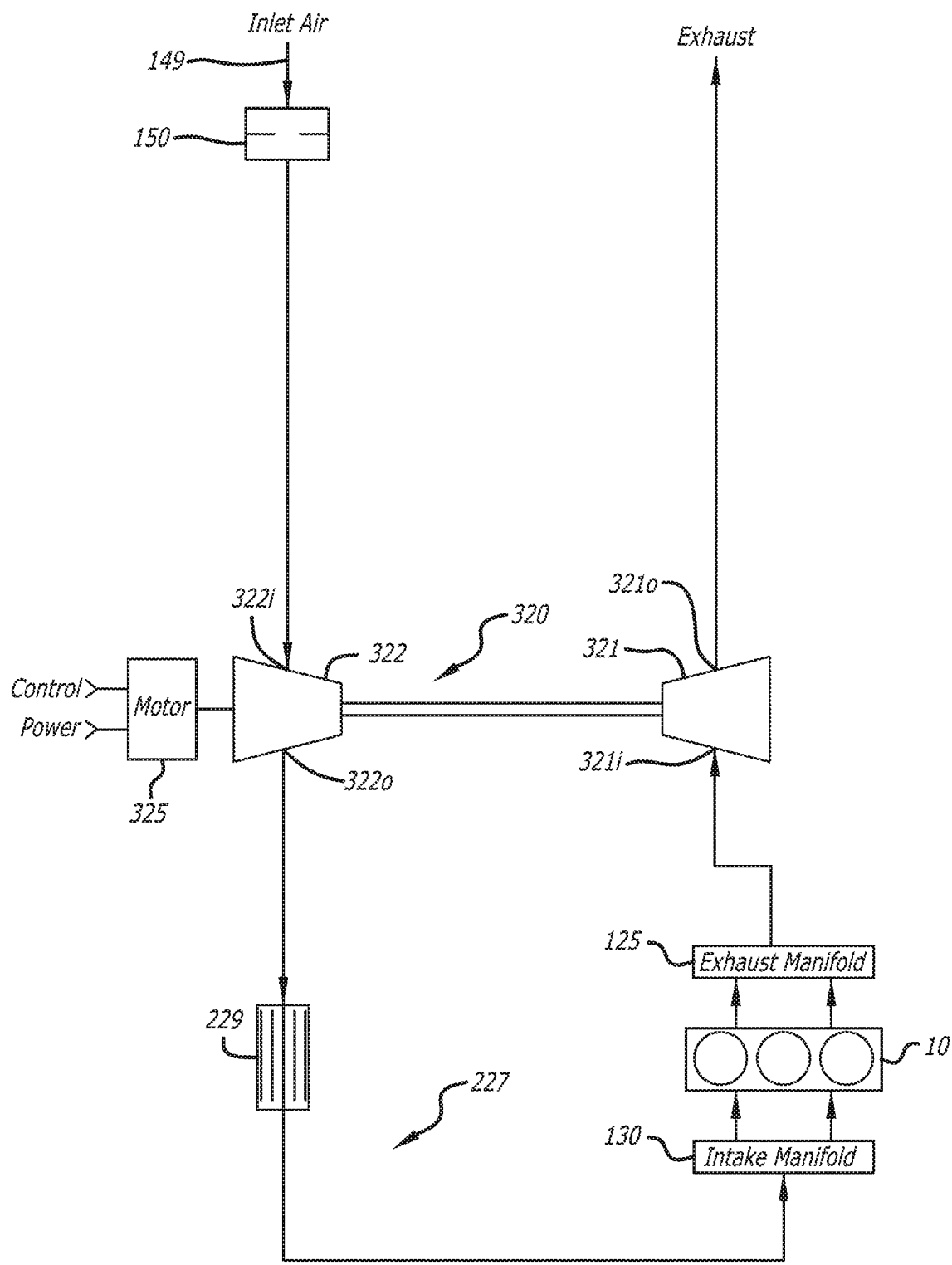

With reference to FIG. 19, the illustrated air handling system has the same construction as shown in FIG. 18, with the exception that the system contains no EGR loop. With reference to FIG. 20, the illustrated air handling system has the same construction as shown in FIG. 18, with the exception that the system contains no EGR loop and no back pressure valve.

In some instances, when excessive power is generated by the turbine 321, the motor 325 can act as a generator and provide electric power for use or storage.

Although this disclosure describes particular embodiments for air handling systems with externally-assisted boosting for turbocharged opposed-piston engines, these embodiments are set forth merely as examples of underlying principles of this disclosure. Thus, the embodiments are not to be considered in any limiting sense.

The invention claimed is:

1. An air handling system of an opposed-piston engine including at least one cylinder with piston-controlled exhaust and intake ports, the air handling system comprising:
   a charge air channel coupled to provide charge air to at least one piston-controlled intake port of the opposed-piston engine;
   an exhaust channel coupled to transport exhaust gas from at least one piston-controlled exhaust port of the opposed-piston engine;
   an open intake chamber in which all piston-controlled intake ports of the engine are located for receiving charge air, the open intake chamber having charge air inlets on opposing sides of a cylinder block;
   a turbocharger with a turbine in the exhaust channel and a compressor in the charge air channel; and,
   an electrically-assisted compressor in the charge air channel, upstream of an inlet of the compressor of the turbocharger;
   the charge air channel comprising first and second branches downstream of an outlet of the compressor of the turbocharger, the first and second branches having a common input coupled to the outlet of the compressor of the turbocharger, each of the first and second branches including a respective charge air cooler placed between the common input and a respective one of the charge air inlets.

2. The air handling system of claim 1, further comprising an EGR loop having an inlet in the exhaust channel, downstream of an outlet of the turbine, and an outlet in the charge air channel, upstream of an inlet of the electrically-assisted compressor.

3. The air handling system of claim 2, wherein the turbine comprises a fixed geometry device or a VGT device.

4. The air handling system of claim 1, wherein the turbine comprises a fixed geometry device or a VGT device.

5. An air handling system for an opposed-piston engine including at least one cylinder with piston-controlled exhaust and intake ports, the air handling system comprising:
   a charge air channel coupled to provide charge air to at least one piston-controlled intake port of the opposed-piston engine;
   an exhaust channel coupled to transport exhaust gas from at least one piston-controlled exhaust port of the opposed-piston engine;

an open intake chamber in which all piston-controlled intake ports of the opposed-piston engine are located for receiving charge air, the open intake chamber having charge air inlets on opposing sides of a cylinder block;

a turbocharger with a turbine in the exhaust channel and a compressor in the charge air channel; and, an electrically-assisted supercharger disposed in the charge air channel, in series with the compressor, downstream of an outlet of the compressor;

the charge air channel comprising first and second branches downstream of the electrically-assisted supercharger, the first and second branches having a common input coupled to an outlet of the electrically-assisted supercharger, and each of the first and second branches including a respective charge air cooler placed between the common input and a respective one of the charge air inlets.

6. The air handling system of claim 5, further comprising:

an open exhaust chamber in which all piston-controlled exhaust ports of the opposed-piston engine are located for expelling exhaust gas, the open exhaust chamber having exhaust outlets on the opposing sides of the cylinder block; and, an EGR loop having an inlet coupled to one of the exhaust outlets and having an outlet in the charge air channel, the outlet being placed in the charge air channel between an outlet of the compressor and an inlet of the electrically-assisted supercharger.

7. The air handling system of claim 6, wherein the turbine comprises a fixed geometry device or a VGT device.

8. The air handling system of claim 5, wherein the turbine comprises a fixed geometry device or a VGT device.

9. An air handling system for an opposed-piston engine without a supercharger and including at least one cylinder with piston-controlled exhaust and intake ports, the air handling system comprising:

a charge air channel coupled to provide charge air to at least one piston-controlled intake port of the opposed-piston engine;

an exhaust channel coupled to transport exhaust gas from at least one piston-controlled exhaust port of the opposed-piston engine;

an electrically-assisted turbocharger with a turbine in the exhaust channel and a compressor in the charge air channel; and, an open intake chamber in which all piston-controlled intake ports of the opposed-piston engine are located for receiving charge air, the open intake chamber having charge air inlets on opposing sides of a cylinder block; and, the charge air channel comprising first and second branches downstream of the compressor, the first and second branches having a common input coupled to an outlet of the compressor, and each of the first and second branches including a respective charge air cooler placed between the common input and a respective one of the charge air inlets.

10. The air handling system of claim 9, further comprising:

an EGR loop having an inlet in the exhaust channel, downstream of an outlet of the turbine, and an outlet in the charge air channel, upstream of an inlet of the compressor.

11. The air handling system of claim 10, wherein the turbine comprises a fixed geometry device or a VGT device.

12. The air handling system of claim 9, wherein the turbine comprises a fixed geometry device or a VGT device.

* * * * *